United States Patent
Jeong et al.

(10) Patent No.: US 10,718,690 B2
(45) Date of Patent: Jul. 21, 2020

(54) REUSABLE DRIVE MODULE FOR COLLISION TESTING A VEHICLE

(71) Applicant: Kookmin University Industry Academy Cooperation Foundation, Seoul (KR)

(72) Inventors: Jay Il Jeong, Seoul (KR); Yeong Geol Park, Gyeonggi-do (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 16/093,462

(22) PCT Filed: Apr. 5, 2017

(86) PCT No.: PCT/KR2017/003730
§ 371 (c)(1),
(2) Date: Oct. 12, 2018

(87) PCT Pub. No.: WO2017/179851
PCT Pub. Date: Oct. 19, 2017

(65) Prior Publication Data
US 2019/0301977 A1    Oct. 3, 2019

(30) Foreign Application Priority Data
Apr. 15, 2016 (KR) .................. 10-2016-0046497

(51) Int. Cl.
*G01M 17/007* (2006.01)
*G01L 5/00* (2006.01)
*G01M 7/08* (2006.01)

(52) U.S. Cl.
CPC ....... *G01M 17/0078* (2013.01); *G01L 5/0052* (2013.01); *G01M 7/08* (2013.01); *G01M 17/007* (2013.01)

(58) Field of Classification Search
CPC .. G01M 17/0078; G01M 7/08; G01M 17/007; G01L 5/0052
USPC ....................................................... 73/12.01
See application file for complete search history.

(56) References Cited

U.S. PATENT DOCUMENTS

| | | | | |
|---|---|---|---|---|
| 4,697,294 | A * | 10/1987 | Schafer | E01C 5/005 14/69.5 |
| 4,892,002 | A * | 1/1990 | Groat | B62D 1/192 180/78 |
| 9,182,942 | B2 | 11/2015 | Kelly et al. | |
| 2013/0018528 | A1 * | 1/2013 | Kelly | B60T 7/18 701/2 |

FOREIGN PATENT DOCUMENTS

| | | |
|---|---|---|
| JP | 2011-232118 | 11/2011 |
| KR | 10-0904767 | 6/2009 |
| KR | 10-1469132 | 12/2014 |

* cited by examiner

*Primary Examiner* — Natalie Huls
*Assistant Examiner* — Monica S Young
(74) *Attorney, Agent, or Firm* — Harrington & Smith

(57) ABSTRACT

Provided is a target driving object for carrying out a crash test with a colliding object for a crash prevention system test, and more particularly, a target driving object in which a sloped skirt is provided on the outside of a main body including a drive module and a communication module, thereby blocking a substantial impact and preventing occurrence of a breakdown.

13 Claims, 18 Drawing Sheets

REUSABLE DRIVE MODULE FOR COLLISION TESTING A VEHICLE

This patent application is a U.S. National Stage application of International Patent Application Number PCT/KR2017/003730 filed Apr. 5, 2017, which is hereby incorporated by reference in its entirety, and claims priority to KR 10-2016-0046497 filed Apr. 15, 2016.

TECHNICAL FIELD

The present disclosure relates to a target driving object for carrying out a crash test with a colliding object for a crash prevention system test, and more particularly, to a target driving object in which a sloped skirt is provided on the outside of a main body including a drive module and a communication module, thereby blocking a substantial impact and preventing occurrence of a breakdown.

BACKGROUND ART

A vehicle is convenient transportation but may cause serious loss of lives and properties in case of accidents. To prevent accidents, a vehicle is equipped with various safety devices such as a bumper for cushioning impact and a safety belt.

Recently, active safety systems have been developed and used to actively prevent an accident prior to a collision between vehicles. Accordingly, crash prevention systems for preventing car crash have been actively developed. Such crash prevention systems appropriately control a drive of a vehicle when there is another vehicle approaching or when various signs of collision are sensed, thereby preventing a collision or minimizing collision damage.

These crash prevention systems are very simple means for protecting lives and properties, and the reliability thereof is very important. In particular, crash prevention systems function in a somewhat extreme situation, i.e., a vehicle-to-vehicle accident, and therefore, there is a limit when an ordinary person tries to test the performance of the crash prevention systems. Therefore, it is necessary to permit a launch of a crash prevention system only when certain reliability is guaranteed after the crash prevention system undergoes an appropriate test during loading and manufacturing processes.

Accordingly, it is very important to develop an appropriate test and evaluation system for testing and evaluating a crash prevention system. In particular, since a driving situation variously changes, it is desired to develop a test and evaluation system for enabling a crash prevention system to be tested in an environment corresponding to a real driving situation.

However, an unexpected accident may occur even during test and evaluation of a crash prevention system. Accordingly, it is also important to prevent the cost of testing from increasing due to a driver's injury and damage to a vehicle during a test between vehicles loaded with a crash prevention system.

Accordingly, a test apparatus for reproducing a situation similar to a real driving situation and preventing driver's accident and an increase in test cost is required, and therefore, a dummy vehicle similar to a real vehicle has been developed and used for a test.

Such a dummy vehicle is usually formed by putting a cover having a vehicle shape on a small target driving object to reproduce the same driving situation as a real vehicle. However, even in this case, a substantial impact may be applied to the target driving object, resulting in damage to the target driving object, when the dummy vehicle crashes into a colliding object.

Therefore, a target driving object for preventing damage during a crash test is desired to be developed.

DESCRIPTION OF EMBODIMENTS

Technical Problem

Provided is a target driving object in which a sloped skirt is provided on the outside of a main body including a drive module and a communication module, thereby blocking a substantial impact and preventing occurrence of a breakdown.

Solution to Problem

According to an aspect of the present disclosure, a target driving object for carrying out a crash test with a colliding object for a crash prevention system test includes a main body loaded with a drive module and a communication module exchanging signals with an external communication device; and a sloped skirt positioned to surround an outer circumferential side of the main body, wherein the sloped skirt has a sloped surface inclining downwards and outwards from a border between the sloped skirt and the main body, the sloped surface is formed in an outer circumference of the target driving object, the colliding object is allowed to climb up on or down from the main body along the sloped surface, and the main body and the sloped skirt are detachable from each other using a certain connecting means.

The main body may include a base frame having a certain framework and a loading space in which the drive module and the communication module are loaded. The base frame may include a bottom plate forming a bottom surface and having a wheel hole penetrating the bottom plate downwards; a top plate forming a top surface; and a side plate forming an outer circumference. The sloped skirt may include a bottom skirt plate forming a bottom surface; a side skirt plate located at a side of the bottom skirt plate and standing upwards to form a side surface; a triangular frame having a triangular shape with a base side, a lateral side, and an oblique side, the base side being on the bottom skirt plate, and the lateral side being in contact with the side skirt plate; and a sloped plate put on the oblique side of the triangular frame to forms the sloped surface. The side plate and the side skirt plate may be detachably combined with each other using the certain connecting means.

The target driving object may further include a sub-body loaded with the drive module. The sub-body may be selectively and detachably combined with the main body at the outer circumferential side of the main body to form a combination body, and the sloped skirt may be positioned to surround an outer circumferential side of the combination body.

The drive module may include an actuator producing torque; a drive wheel exposed downwards through the wheel hole to be on the ground, receiving the torque from the actuator, and moving the target driving object; a driveshaft extending to a certain length and transmitting the torque of the actuator to the drive wheel; and a repositioning module. The drive wheel may be configured to be vertically displaceable with respect to the main body. The repositioning module may apply a restoring force to the driveshaft to maintain a rotation axis of the drive wheel and a rotation axis of the actuator to be coaxial.

The driveshaft may include a first shaft positioned at an end of the driveshaft in a length direction to form the rotation axis of the actuator; a second shaft positioned at an opposite end of the driveshaft in the length direction to form the rotation axis of the drive wheel; and a hinge module connecting the first shaft with the second shaft and having a variable shape. The driveshaft may have an initial mode and a deformation mode according to the variable shape of the hinge module. In the initial mode, the driveshaft may have a straight-line shape, the first shaft and the second shaft may be coaxial, and the respective rotation axes of the drive wheel and the actuator may be coaxial. In the deformation mode, the driveshaft may be bent, the first shaft and the second shaft may be biaxial, and the respective rotation axes of the drive wheel and the actuator may be biaxial. The repositioning module may apply the restoring force to the driveshaft to allow the driveshaft to remain in the initial mode. When a force pushing downwards is applied to the main body and overcomes the restoring force of the repositioning module in a state where the drive wheel is on the ground, the driveshaft may enter the deformation mode. When the restoring force of the repositioning module overcomes the downward pushing force on the main body or the downward pushing force is eliminated, the driveshaft may return to the initial mode due to the restoring force of the repositioning module.

The hinge module may include a first rotation unit which is bilaterally symmetrical; two second rotation units respectively positioned on left and right sides of the first rotation unit to face each other with the first rotation unit between the second rotation units; and two rotation blocks each positioned between the first rotation unit and one of the second rotation units to connect the first rotation unit with the second rotation unit. The first rotation unit and the rotation blocks may be rotatable around a Z-axis. The second rotation units and the rotation blocks may be rotatable around a Y-axis perpendicular to the Z-axis. The second rotation units, the first shaft, and the second shaft may be combined with one another in an X-axis direction perpendicular to the Z-axis and the Y-axis.

The first rotation unit may have a first hinge hole penetrating each of opposite sides of the first rotation unit in a Z-axis direction. Each of the second rotation units may have a shaft connecting hole and a second hinge hole, the shaft connecting hole penetrating a side of each of the second rotation units in the X-axis direction, each of the second rotation units being connected to the first shaft or the second shaft, and the second hinge hole penetrating an opposite side of each of the second rotation units in a Y-axis direction, the opposite side facing the first rotation unit. Each of the rotation blocks may have a first rotary protrusion and a second rotary protrusion, the first rotary protrusion protruding in the Z-axis direction to be inserted in the first hinge hole, and the second rotary protrusion protruding in the Y-axis direction to be inserted into the second hinge hole.

The repositioning module may include a seesaw unit having an end portion connected to the second shaft and enabling a seesaw motion around a certain axis; a restoring force application unit applying a restoring force to an opposite end portion of the seesaw unit; and a rotation connector connecting the seesaw unit with the restoring force application unit.

The seesaw unit may include a seesaw beam and a seesaw jig. The seesaw beam may have a certain length in a back-and-forth direction and have a first end portion and a second end portion. The seesaw beam may include a central hole penetrating a lengthwise central portion of the seesaw beam in a horizontal direction; a first side hole penetrating the first end portion in the horizontal direction; and a second side hole penetrating the second end portion in the horizontal direction. The first end portion may be positioned beside the drive wheel in a direction of the rotation axis of the drive wheel. The first side hole may be in a path in which the second shaft extends. The second shaft may pass through the first side hole 314 in the horizontal direction and be connected to the drive wheel. The second side hole may be rotatably coupled to the rotation connector such that the second end portion may receive the restoring force from the restoring force application unit via the rotation connector. The seesaw jig may be positioned in the back of the drive wheel and fixed to the bottom plate so as to have a fixed position and may include a seesaw axle extending in a horizontal direction. The seesaw axle may be inserted into the central hole such that the seesaw beam may perform a seesaw motion around the seesaw axle.

The seesaw beam may further include a braking protrusion protruding downwards from a bottom of a lengthwise portion between the central hole and the first side hole. When the first end portion of the seesaw beam is inclined downwards at a certain angle, the braking protrusion may contact the bottom plate, thereby preventing the first end portion of the seesaw beam from being further inclined downwards and maintaining a position of the seesaw beam.

The hinge module and the driveshaft may have a straight-line shape when the braking protrusion is in contact with the bottom plate.

The restoring force application unit may include a variable beam of which a length varies; and an elastic portion applying an elastic force to the variable beam to elongate the variable beam. The variable beam may be elongated by receiving the elastic force from the elastic portion and may push upwards the second end portion of the seesaw beam through the rotation connector such that the seesaw beam may rotate around the seesaw axle and the first end portion inclines downward.

The variable beam may include a front beam and a rear beam respectively positioned in the front and the back in a length direction. The front beam may have a first supporting extension having an outer diameter extending from a middle portion of the front beam. The rear beam may have a second supporting extension having an outer diameter extending from a middle portion of the rear beam. The front beam and the rear beam may be mutually displaced in the length direction such that a distance between the first supporting extension and the second supporting extension and a whole length of the variable beam may vary. The elastic portion may be positioned between the first supporting extension and the second supporting extension to apply the elastic force to the first supporting extension and the second supporting extension.

An insertion hole may be formed to penetrate a front portion of the rear beam or a rear portion of the front beam in the length direction and an insertion beam is provided in the rear portion of the front beam or the front portion of the rear beam to be inserted into the insertion hole such that the whole length of the variable beam varies with a length of the insertion beam, by which the insertion beam is inserted into the insertion hole. The elastic portion may include a coil spring and may be configured to be wound around the front portion of the rear beam and the rear portion of the front beam.

The seesaw jig may further include a holding shaft. The front beam may have a front hole formed to penetrate a front portion of the front beam in the horizontal direction and the holding shaft may pass through and coupled to the front hole such that the variable beam may be rotatable around the holding shaft.

The rear beam may have a rear hole formed to penetrate a rear portion of the rear beam in the horizontal direction. The rotation connector may include a connection jig positioned in the back of the seesaw jig and fixed to the bottom plate; a lower beam having an end rotatably connected to the connection jig and another end rotatably connected to the rear hole of the rear beam; an upper beam having an end rotatably connected to the second end portion of the seesaw beam and another end rotatably connected to the rear hole of the rear beam; and a connection shaft connecting the another end of the upper beam, the another end of the lower beam, and the rear hole of the rear beam with one another.

The drive module may further include a braking module. The braking module may include a braking plate rotatably fixed to the driveshaft and a friction portion contacting the braking plate and producing friction.

The communication module may include an antenna protruding upwards from the main body. The antenna may be configured to be folded or compressed and thus inserted into the main body when a weight is put on the antenna.

Advantageous Effects of Disclosure

According to embodiments of the present disclosure, a main body and a sub-body is selectively combined with each other into a target driving object, so that a crash test may be performed according to a user's intention. In particular, the power and size of the target driving object is increased by the drive module of the sub-body, so that a similar situation to a real crash may be reproduced.

In addition, since a sloped skirt is provided at the outside of the target driving object, a certain colliding object may climb up on or down from the target driving object without giving a shock to the target driving object when the colliding object crashes into the target driving object. Accordingly, damage or breakdown of the target driving object may be prevented.

In addition, since a drive wheel is configured to be displaceable with respect to the main body and the sub-body and to receive a restoring force from a restoration module, occurrence of damage to members of the drive module may be avoided even when the colliding object climbs up and puts a weight on the target driving object.

In addition, an antenna of a communication module is folded or compressed when the colliding object climbs up on the target driving object and thus avoids damage by the colliding object, so that a failure rate may be decreased.

BEST MODE

Figure 1:
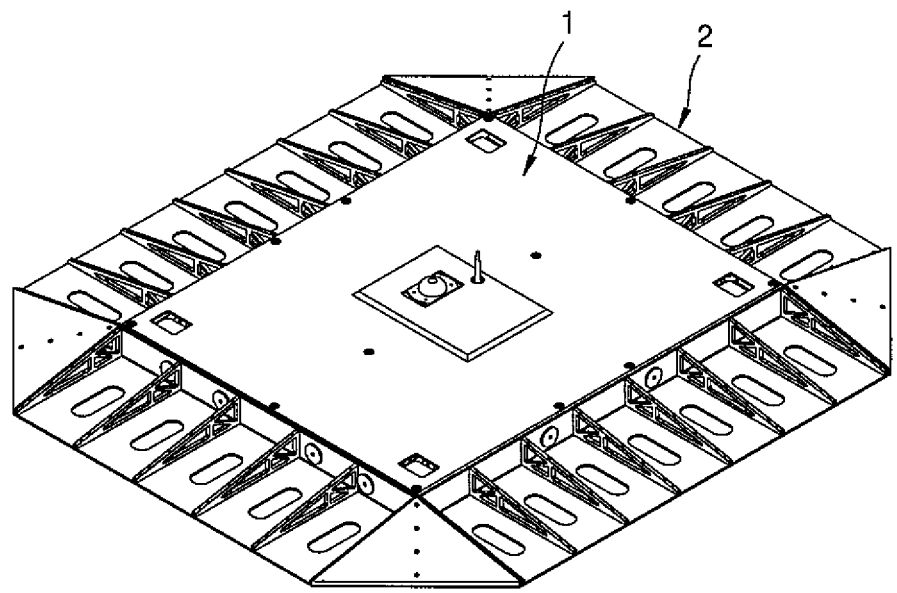
FIG. 1 is a diagram of the overall shape of a target driving object, according to an embodiment of the present disclosure.

According to an aspect of the present disclosure, a target driving object for carrying out a crash test with a colliding object for a crash prevention system test includes a main body loaded with a drive module and a communication module exchanging signals with an external communication device; and a sloped skirt positioned to surround an outer circumferential side of the main body, wherein the sloped skirt has a sloped surface inclining downwards and outwards from a border between the sloped skirt and the main body, the sloped surface is formed in an outer circumference of the target driving object, the colliding object is allowed to climb up on or down from the main body along the sloped surface, and the main body and the sloped skirt are detachable from each other using a certain connecting means.

Mode of Disclosure

Embodiments of the present disclosure will be described with reference to the accompanying drawings.

Angles and directions mentioned in the explanation of the structures of the embodiments refer to those illustrated in the drawings. Relevant drawings will be referred to if the positional relation between an angle and a reference point is not clearly mentioned in the explanation.

Figure 2:
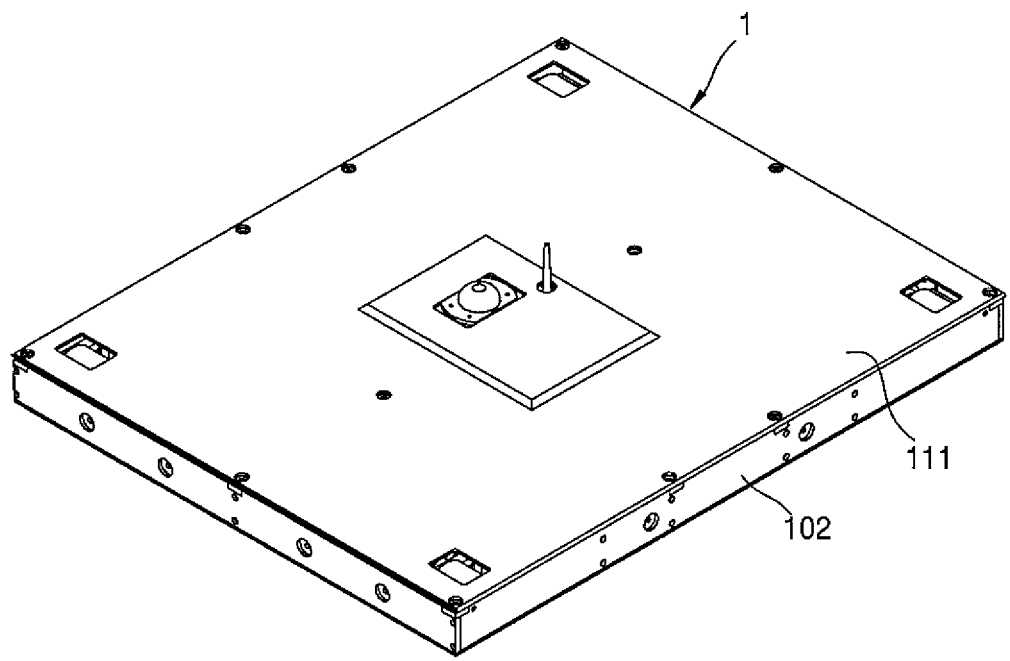
FIG. 2 is a diagram of a main body of a target driving object, according to an embodiment of the present disclosure.
Figure 3:
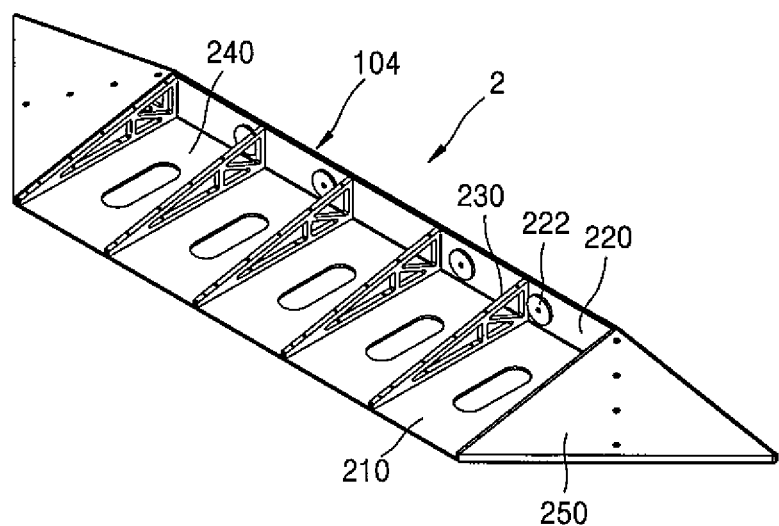
FIG. 3 is a diagram of a sloped skirt of a target driving object, according to an embodiment of the present disclosure.
Figure 4:
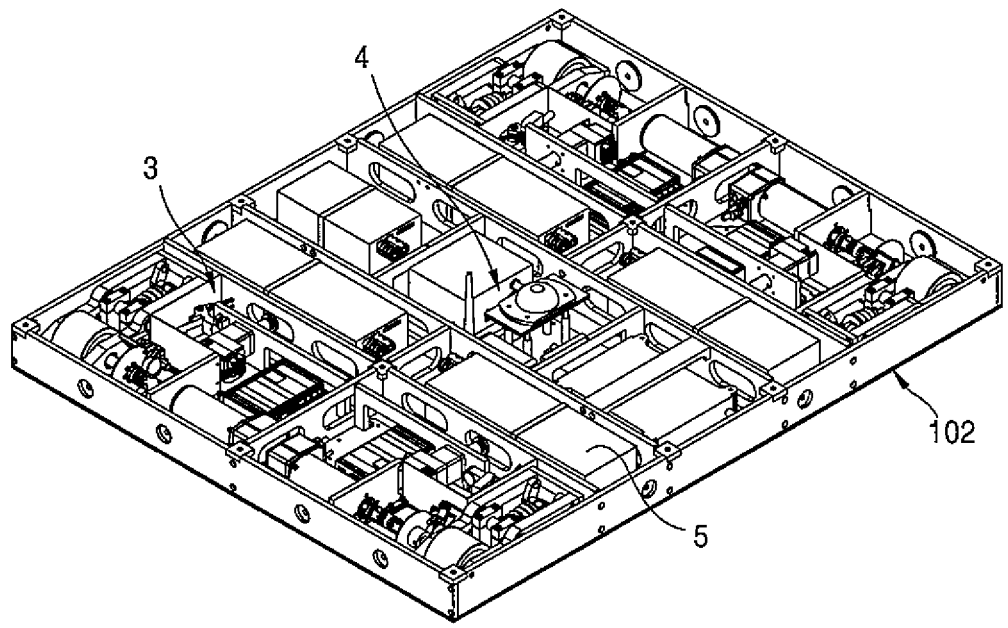
FIG. 4 is a diagram of the internal structure of a main body of a target driving object, according to an embodiment of the present disclosure.
Figure 5:
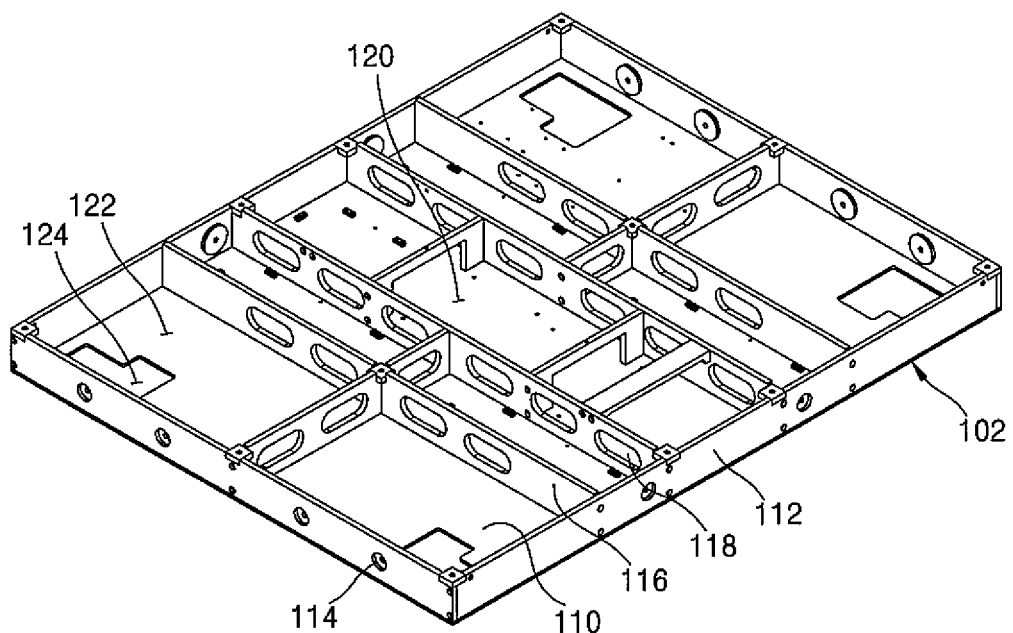
FIG. 5 is a diagram of the structure of a base frame of a main body of a target driving object, according to an embodiment of the present disclosure.

FIG. 1 is a diagram of the overall shape of a target driving object, according to an embodiment of the present disclosure. FIG. 2 is a diagram of a main body 1 of a target driving object, according to an embodiment of the present disclosure. FIG. 3 is a diagram of a sloped skirt 2 of a target driving object, according to an embodiment of the present disclosure. FIG. 4 is a diagram of the internal structure of the main body 1 of a target driving object, according to an embodiment of the present disclosure. FIG. 5 is a diagram of the structure of a base frame 102 of the main body 1 of a target driving object, according to an embodiment of the present disclosure.

According to an embodiment, a target driving object largely includes the main body 1 and the sloped skirt 2 surrounding the outside of the main body 1. Meanwhile, when a crash test is actually performed using the target driving object, a cover having a vehicle shape may be put on the target driving object.

The main body 1 will be described first.

The main body 1 may include a drive module 3, which performs driving, and a communication module 4, which performs communication to exchange signals with an external communication device, and may have the base frame 102 with a loading space for the drive module 3 and the communication module 4. Meanwhile, apart from the drive module 3 and the communication module 4, a processing module 5, which includes a certain operation unit, and a sensor device, which senses various signals, may be provided in the base frame 102.

The drive module 3 and the communication module 4 will be described below in detail. The base frame 102 of the main body 1 will be described first.

The base frame 102 may have a hexahedral shape, which has a certain area and thickness and has a loading space therein, as a whole. However, the base frame 102 is not limited to the hexahedral shape. Desirably, the height of the base frame 102 may be low.

Accordingly, the base frame 102 includes a bottom plate 110 forming a bottom surface, a top plate 111 forming a top surface, a side plate 112 forming an outer circumference, and an inner plate 116 partitioning the loading space.

At this time, the bottom plate 110 may be partially penetrated to have a wheel hole 124 through which a drive wheel 12 of the drive module 3 is exposed downwards, the drive wheel 12 being described below. Desirably, four wheel holes 124 may be respectively located in the corners of the bottom plate 110 such that the drive wheel 12 may stably support and drive the target driving object, as shown in FIG. 5. Accordingly, a drive of a vehicle with four wheels may be reproduced.

The top plate 111 may be separated upwards from the base frame 102 to expose the loading space of the base frame 102. Accordingly, the drive module 3, the communication module 4, and so on, which are loaded in the loading space, may be replaced or repaired.

The side plate 112 forms the outer circumference of the main body 1. In other words, the side plate 112 is located at the outer edge of the bottom plate 110, so that the loading space may be formed and the top plate 111 may cover the loading space. At this time, a connecting means 114 such as a certain fastening screw or a screw hole may be provided in the side plate 112 to enable combination with the sloped skirt 2, which will be described below.

The inner plate 116 may be located in the loading space to partition the loading space and may be fixed to the top plate 111 or between side plates 112. When the loading space is partitioned by the inner plate 116, a first loading space 120, in which the drive module 3 and the communication module 4 are loaded, and a second loading space 122 may be defined, and other various loading spaces loaded with other various modules may also be defined. Meanwhile, a side hole 118 may be formed in the inner plate 116 to allow lines connecting the modules to pass.

The sloped skirt 2 will be described below with reference to FIG. 3.

The sloped skirt 2 may include a skirt frame 104 which has a framework, similarly to the base frame 102 of the main body 1.

Accordingly, the skirt frame 104 includes a bottom skirt plate 210 forming a bottom surface, a side skirt plate 220 forming a side surface, a triangular frame 230, and a sloped plate 240.

The bottom skirt plate 210 includes a certain plate forming the bottom surface of the sloped skirt 2.

The side skirt plate 220 is located at a side of the bottom skirt plate 210 and stands upwards, thereby forming a side surface of the sloped skirt 2. A connecting means 222 may be provided in the side skirt plate 220 so as to be combined with the connecting means 114 provided in the side plate 112 of the main body 1, so that the sloped skirt 2 may be combined with the main body 1.

The triangular frame 230 includes a triangular shape frame with a base side, a lateral side, and an oblique side. The base side is connected to the bottom skirt plate 210 and the lateral side is connected to the side skirt plate 220. Desirably, a plurality of triangular frames 230 may be arranged in parallel to be spaced by a predetermined distance from each other, as shown in FIG. 3.

The sloped plate 240 is put on the oblique side of the triangular frame 230 and forms a sloped surface on the outside of the target driving object. Although the shape of the triangular frame 230 is exposed since the sloped plate 240 is illustrated to be transparent in FIGS. 1 and 3, the sloped plate 240 is located on the oblique side of the triangular frame 230 to form the sloped surface.

Meanwhile, a corner skirt 250 may be provided in a corner portion. The overall structure of the corner skirt 250 may have a similar frame structure to the sloped skirt 2 and thus have a sloped surface.

According to the structure described above, the target driving object may have a sloped surface on an outer circumference thereof. Accordingly, the target driving object is configured to allow a colliding object to climb up on or down from the main body 1 along the sloped surface when the colliding object approaches the target driving object. As a result, there is no direct crash into the main body 1, and therefore, the drive module 3, the communication module 4, and so on in the main body 1 may be prevented from being damaged.

Figure 6:
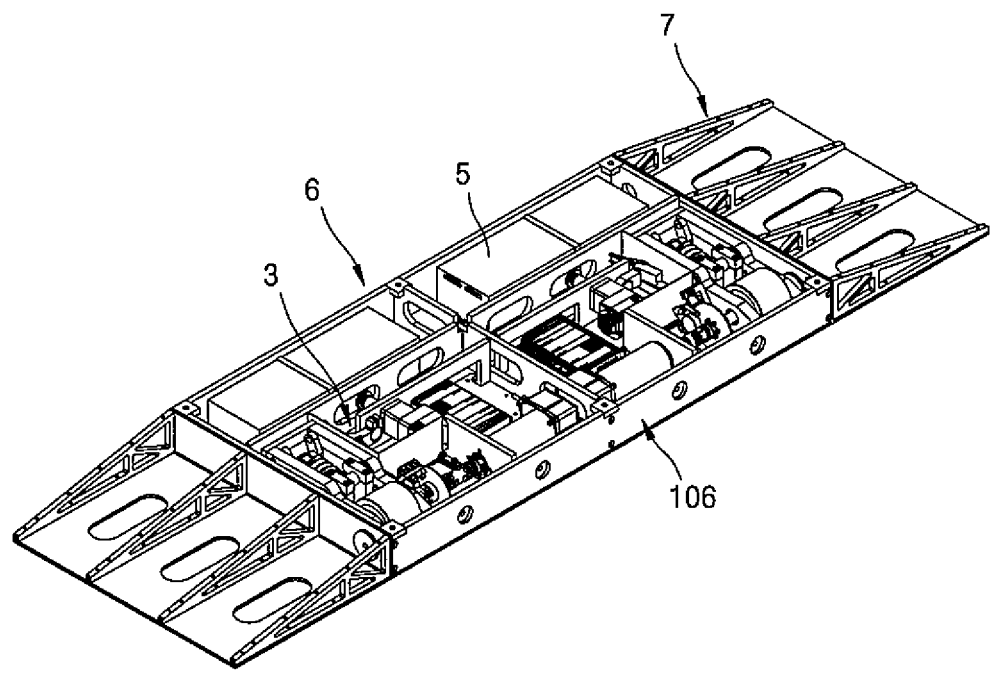
FIG. 6 is a diagram of a sub-body and a sub-sloped skirt of a target driving object, according to an embodiment of the present disclosure.
Figure 7:
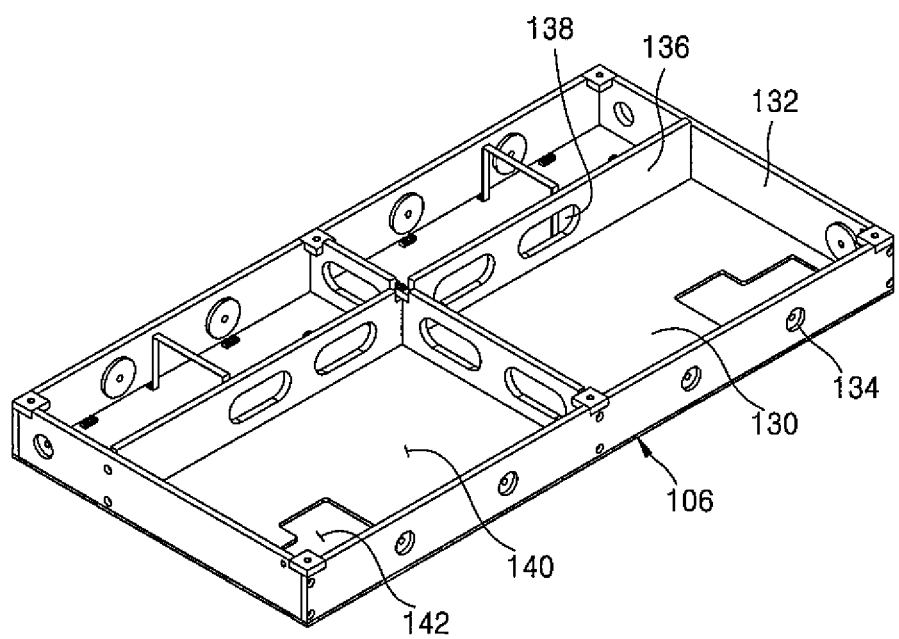
FIG. 7 is a diagram of a sub-frame of a sub-body of a target driving object, according to an embodiment of the present disclosure.
Figure 8:
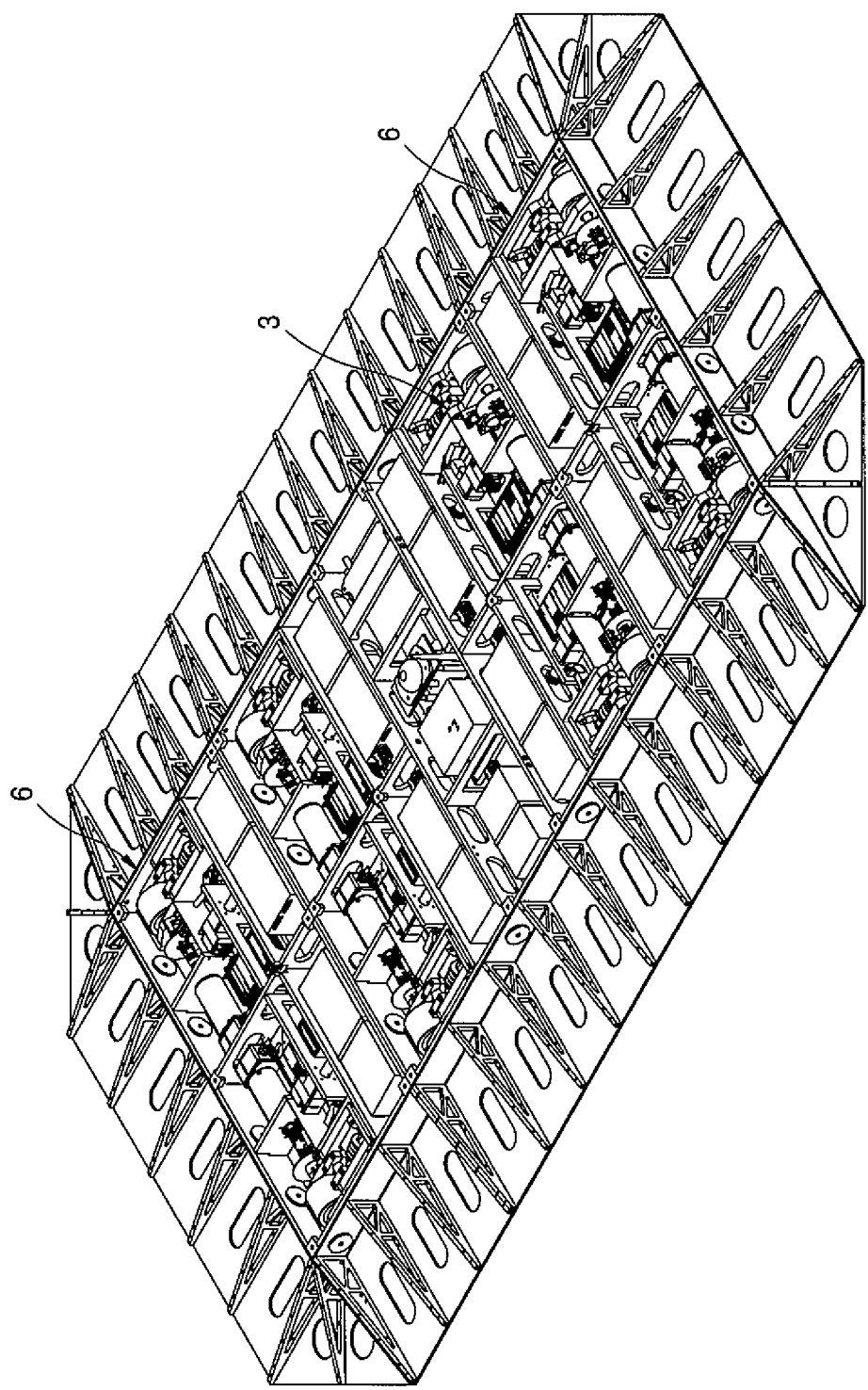
FIG. 8 is a diagram of a state in which a sloped skirt is coupled to the outside of a combination body, into which a main body and a sub-body of a target driving object are combined, according to an embodiment of the present disclosure.

FIG. 6 is a diagram of a sub-body 6 and a sub-sloped skirt 7 of a target driving object, according to an embodiment of the present disclosure. FIG. 7 is a diagram of a sub-frame 106 of the sub-body 6 of a target driving object, according to an embodiment of the present disclosure. FIG. 8 is a diagram of a state in which the sloped skirt 2 is coupled to the outside of a combination body, into which the main body 1 and the sub-body 6 of a target driving object are combined, according to an embodiment of the present disclosure.

According to an embodiment, the target driving object may further include the sub-body 6. The sub-body 6 may have a similar structure to the main body 1 as a whole and thus include the drive module 3 and the sub-frame 106, which respectively correspond to the drive module 3 and the base frame 102 of the main body 1. The drive module 3 of the sub-body 6 has a structure corresponding to the drive module 3 of the main body 1, and the sub-frame 106 has a structure corresponding to the main frame described above. In other words, the sub-frame 106 may include a bottom plate 130 forming a bottom surface, a top plate forming a top surface, a side plate 132 forming an outer circumference, and an inner plate 136 partitioning a loading space. A side hole 138 may be formed in the inner plate 136. The sub-frame 106 may also include a loading space 140 and a wheel hole 142. In addition, a connecting means 134 may be provided to be connected to the main body 1 and the sloped skirt 2.

The drive module 3 of the sub-body 6 may be used together with the drive module 3 of the main body 1 to move the target driving object, thereby strengthening the power of the target driving object. Although not shown, the communication module and other various modules may be further provided, and various connecting means for connection to the main body 1 may also be provided.

Meanwhile, the sub-body 6 may be selectively combined with the main body 1 and thus be combined with the main body 1 at a selective position, such as one side, both sides, the front, or the back of the main body 1, depending on a user's intention. The sub-body 6 may be combined with the main body 1 to form a combination body. The sloped skirt 2 may be connected to an outer circumference of the combination body, as shown in FIG. 8.

Therefore, the sub-body 6 may be selectively and additionally used, depending on a user's intention, so that a crash test may be carried out to fit a real situation. As a result, the efficiency and accuracy of the test may be increased.

The drive module 3 will be described in detail below.

Figure 9:
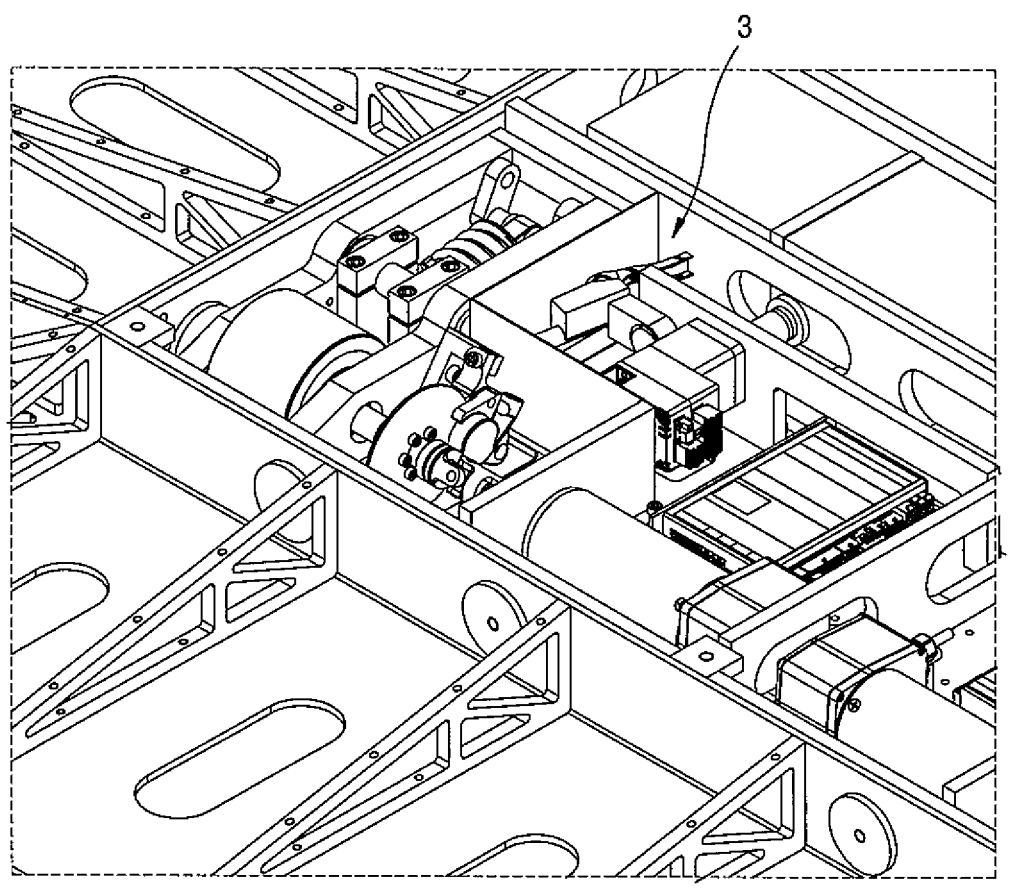
FIG. 9 is a diagram of a state in which a drive module is loaded in a base frame of a target driving object, according to an embodiment of the present disclosure.
Figure 10:
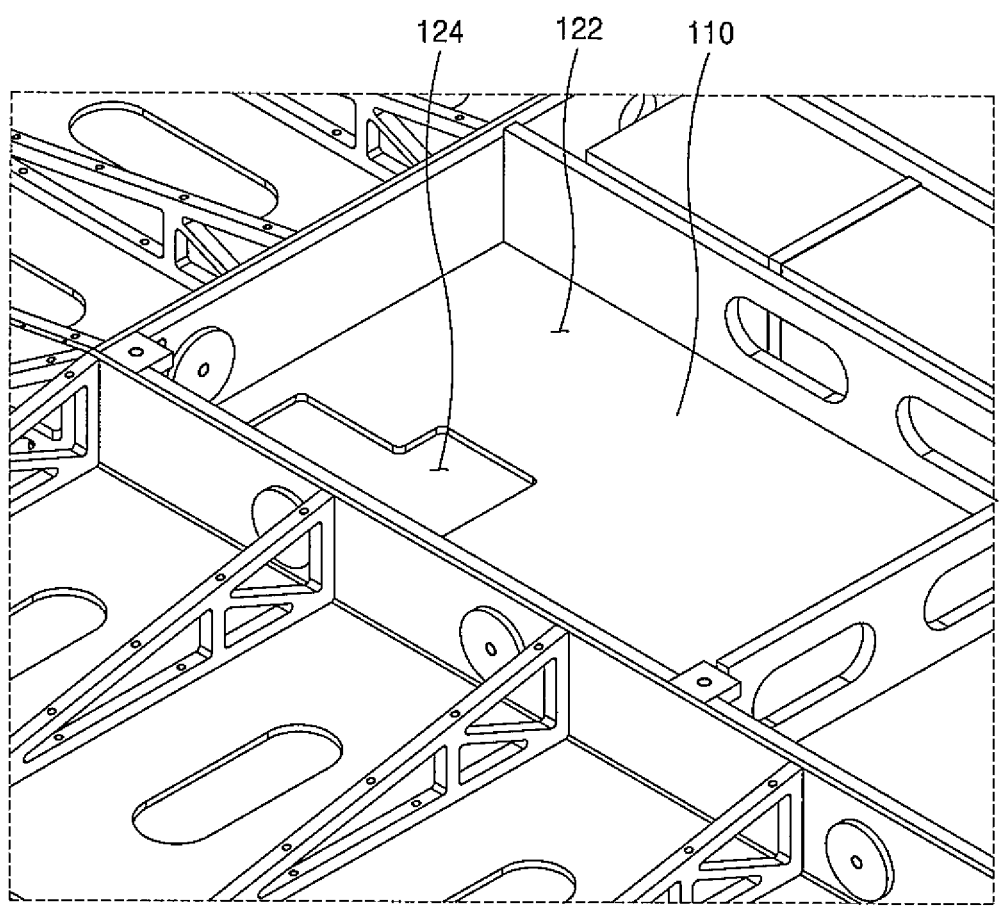
FIG. 10 is a diagram of a state in which a drive module is removed from a base frame of a target driving object, according to an embodiment of the present disclosure.
Figure 11:
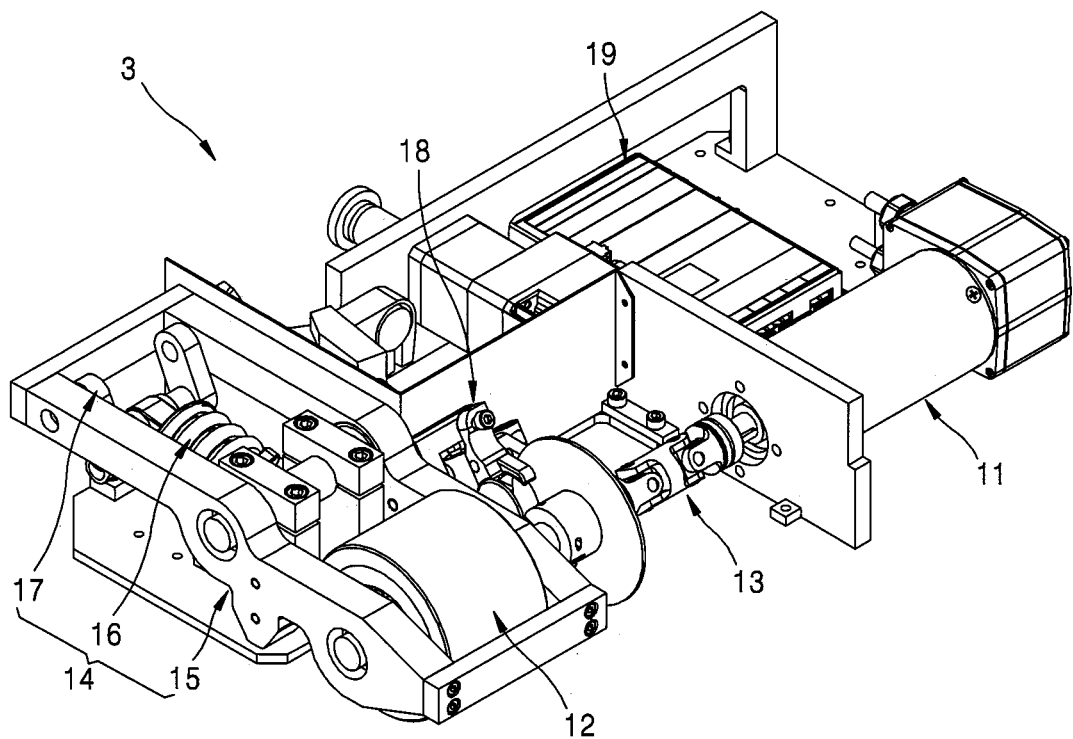
FIG. 11 is a diagram of the form of a drive module of a target driving object, according to an embodiment of the present disclosure.
Figure 12:
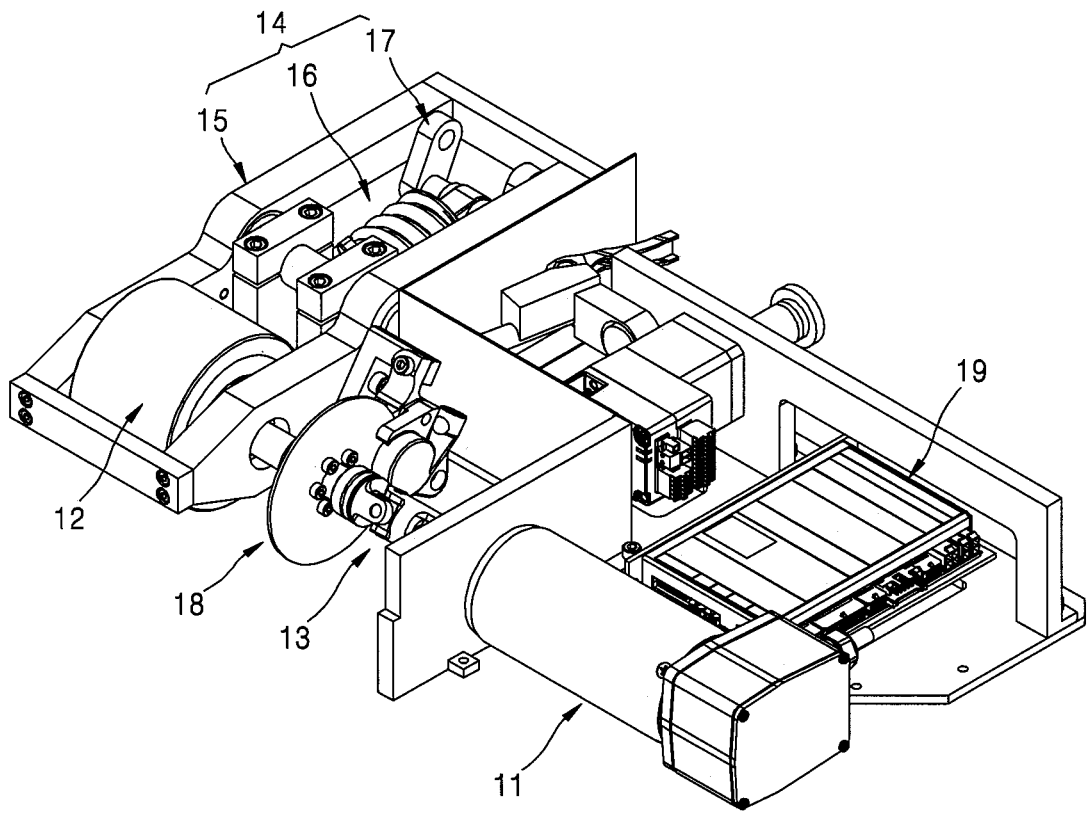
FIG. 12 is a diagram of FIG. 11 viewed from a different direction.
Figure 13:
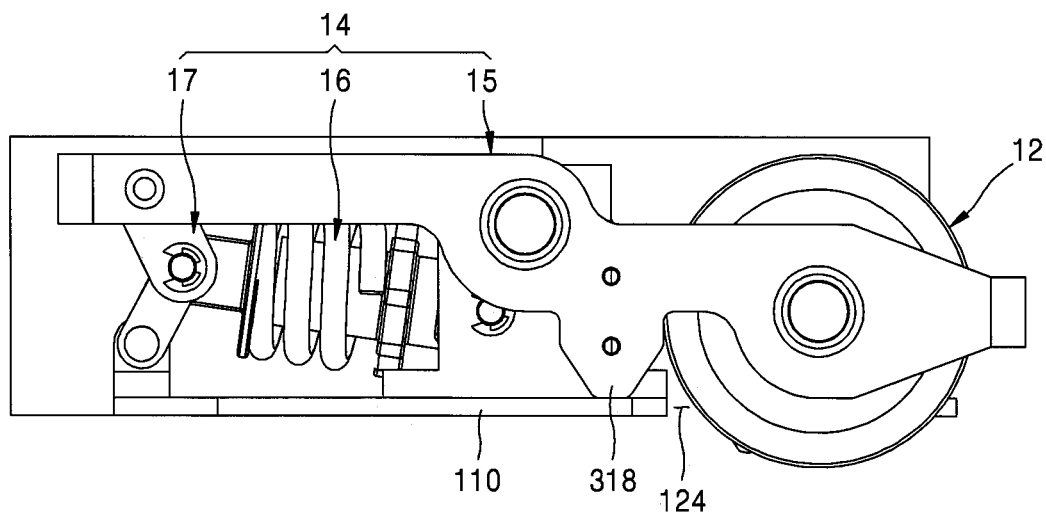
FIG. 13 is a diagram of FIG. 11 viewed from another different direction.
Figure 14:
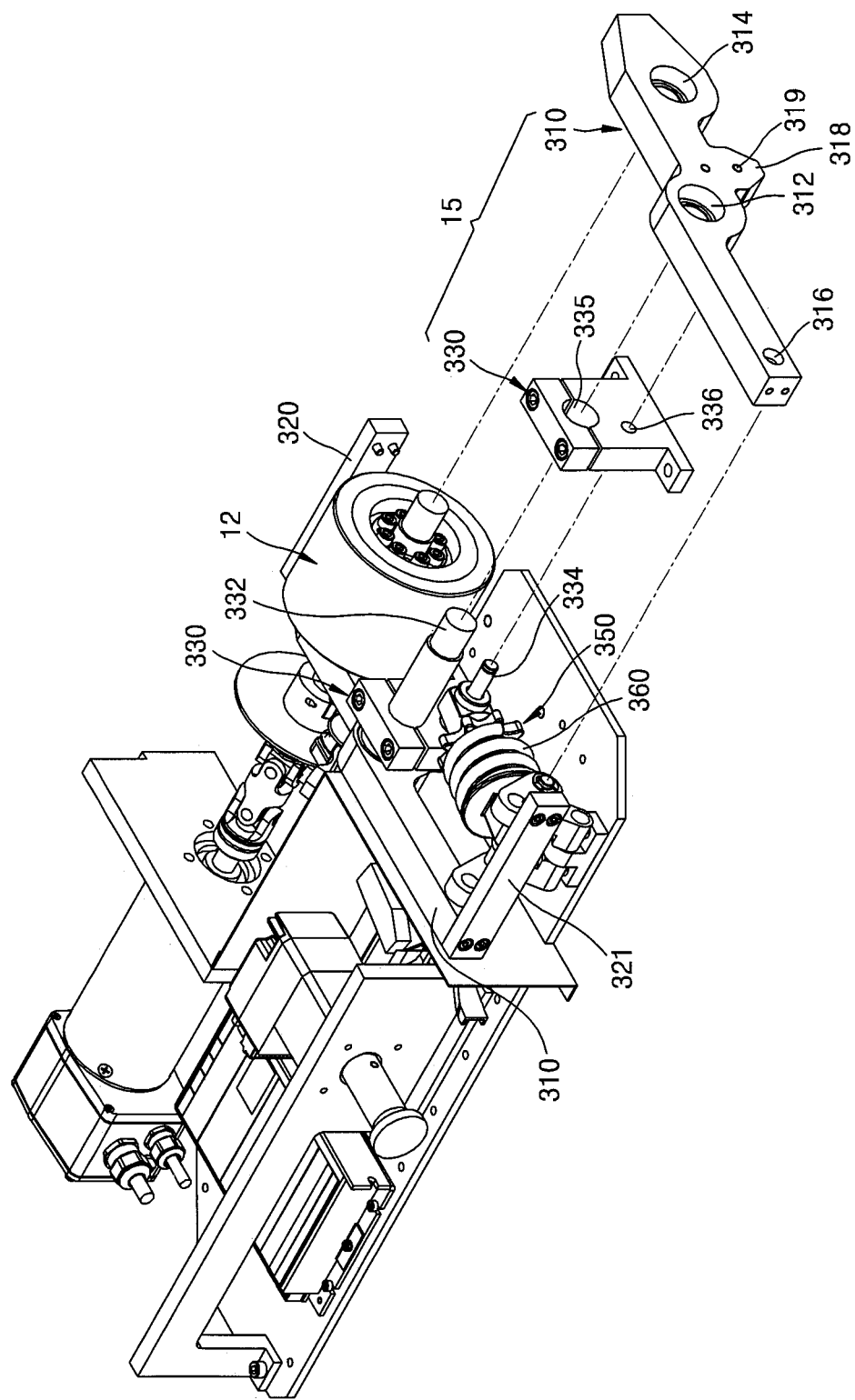
FIG. 14 is a diagram of the structure of a drive module of a target driving object, according to an embodiment of the present disclosure.

FIG. 9 is a diagram of a state in which the drive module 3 is loaded in the base frame 102 of a target driving object, according to an embodiment of the present disclosure. FIG. 10 is a diagram of a state in which the drive module 3 is removed from the base frame 102 of a target driving object, according to an embodiment of the present disclosure. FIG. 11 is a diagram of the form of the drive module 3 of a target driving object, according to an embodiment of the present disclosure. FIGS. 12 and 13 are diagrams of FIG. 11 viewed from different directions, respectively. FIG. 14 is a diagram of the structure of the drive module 3 of a target driving object, according to an embodiment of the present disclosure.

The drive module 3 may largely include an actuator 11, the drive wheel 12, a driveshaft 13, and a repositioning module 14. The repositioning module 14 may include a seesaw unit 15, a restoring force application unit 16, and a rotation connector 17. The drive module 3 may further include a braking module 18 and a controller 19.

The overall structure and function of each member of the drive module 3 will be described first, and then the detailed structure of the driveshaft 13 and the repositioning module 14 will be described.

The actuator 11 is a member that produces torque. The actuator 11 may be a certain motor. The actuator 11 may produces torque from electric power supplied from a certain power supply unit and may be controlled by the controller 19. The actuator 11 is fixedly arranged in a loading space in a horizontal direction. Accordingly, the rotation axis of the actuator 11 is arranged in the horizontal direction.

Meanwhile, a certain power supply unit, which supplies power to the actuator 11, and the controller 19, which controls the motion of the actuator 11, may be provided.

The drive wheel 12 is a member having a certain wheel shape and is configured to receive torque from the actuator 11 and move a target driving object. Accordingly, the drive wheel 12 may be loaded in a loading space and exposed downwards through the wheel hole 124 formed in the bottom plate 110.

At this time, the drive wheel 12 is configured to be vertically displaceable with respect to the main body 1. The vertical displacement of the drive wheel 12 may be accomplished by the transformation of the driveshaft 13. Meanwhile, the displacement of the drive wheel 12 is not necessarily limited to the vertical direction but may be performed in a back-and-forth direction or a left-and-right direction.

The driveshaft 13 is a shaft-shaped member that extends to a certain length. The driveshaft 13 transmits torque from the actuator 11 to the drive wheel 12. At this time, like the rotation axis of the actuator 11, the driveshaft 13 extends in a horizontal direction.

The driveshaft 13 includes a variable shaft that is deformable. As the shape of the driveshaft 13 varies, the relative position of the drive wheel 12 may be vertically changed with respect to the main body 1. The rotation axis of the drive wheel 12 and the rotation axis of the actuator 11, which are connected to each other via the driveshaft 13, may be coaxial or biaxial.

The configuration of the driveshaft 13 will be described in detail below.

The repositioning module 14 includes a certain device that applies a restoring force to the driveshaft 13. The repositioning module 14 applies a restoring force to the driveshaft 13 so that the driveshaft 13 remains in a straight-line shape when there is no external force applied thereto.

Accordingly, during a normal drive, the driveshaft 13 has a straight-line shape and the respective rotation axes of the drive wheel 12 and the actuator 11 are coaxial. However, when a weight is applied to the main body 1 and overcomes the restoring force of the repositioning module 14, the driveshaft 13 is deformed and the respective rotation axes of the drive wheel 12 and the actuator 11 become biaxial.

However, when the weight is eliminated, the driveshaft 13 recovers the straight-line shape due to the repositioning module 14 and the respective rotation axes of the drive wheel 12 and the actuator 11 become coaxial.

The configuration of the repositioning module 14 will be described in detail below.

Figure 15:
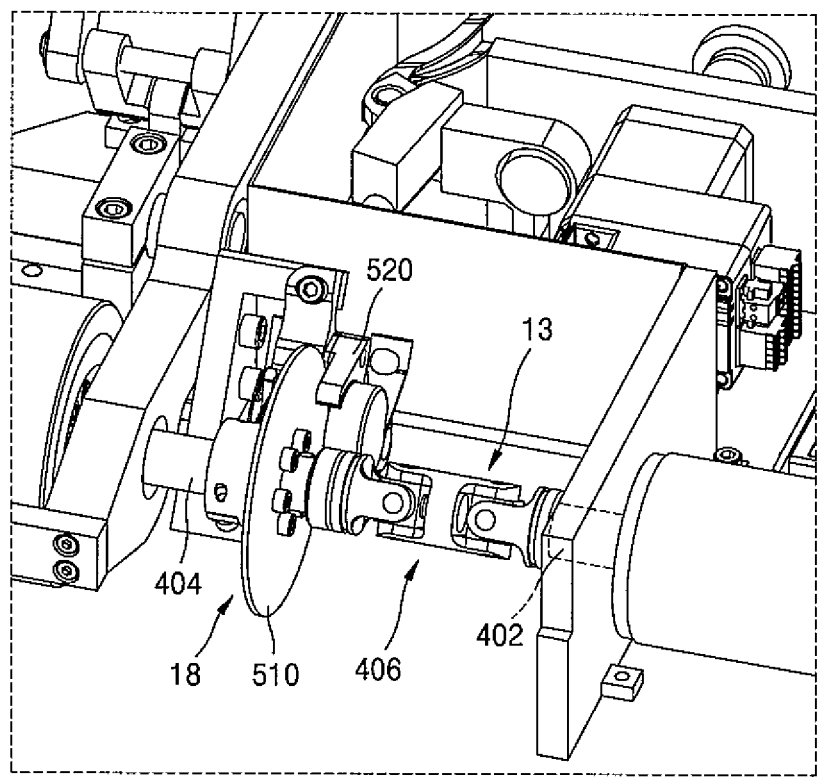
FIG. 15 is a diagram of the structure of a driveshaft and a hinge module of a target driving object, according to an embodiment of the present disclosure.
Figure 16:
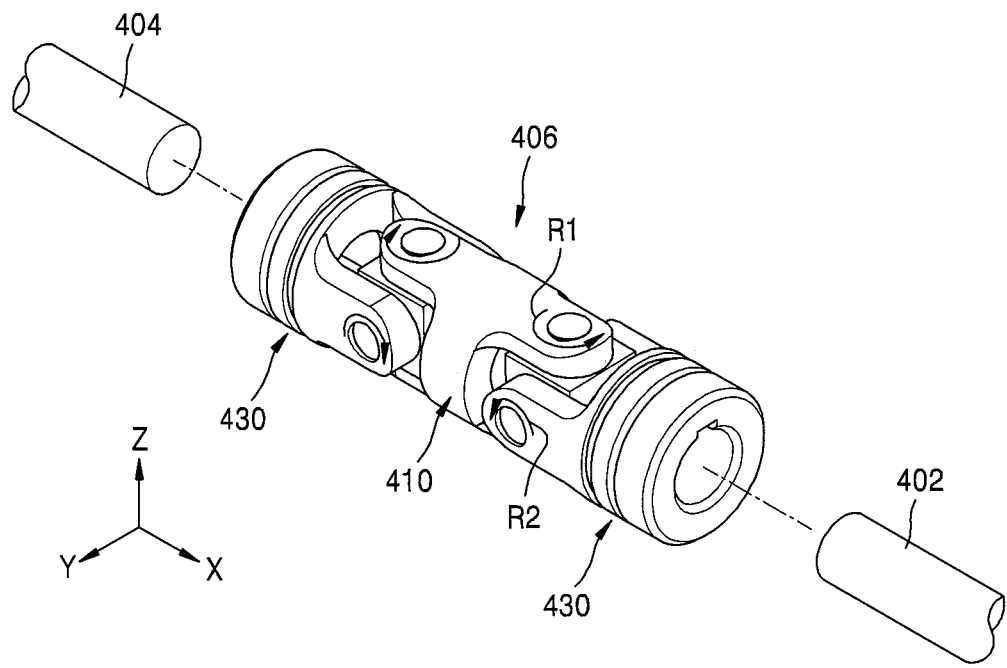
FIG. 16 is a diagram of the structure of a hinge module of a target driving object, according to an embodiment of the present disclosure.
Figure 17:
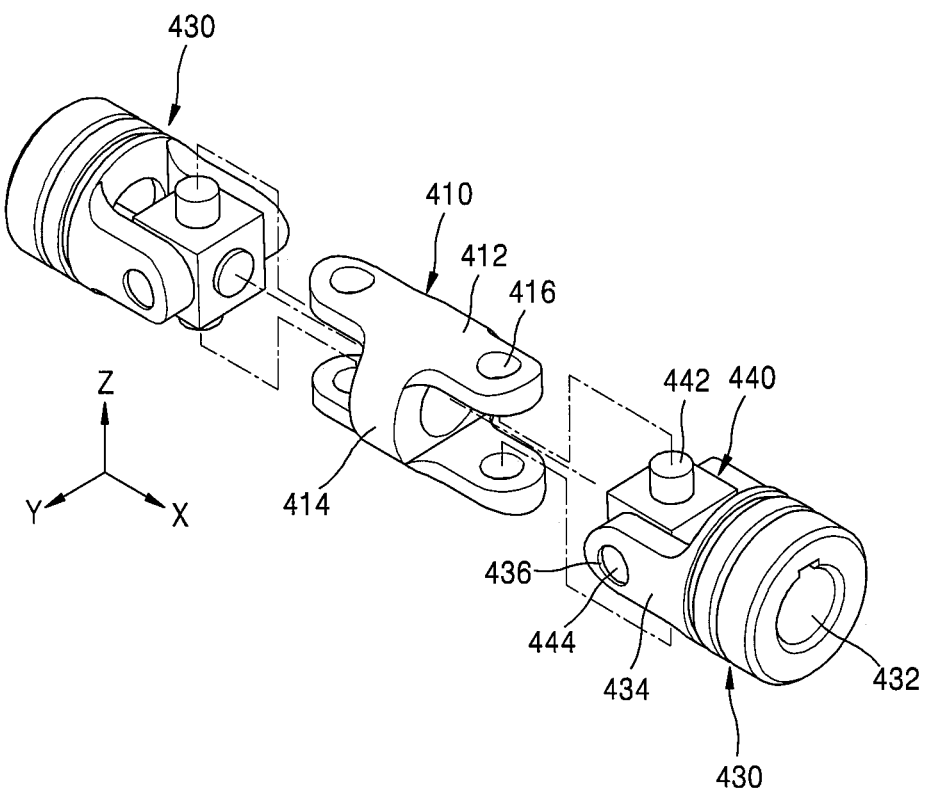
FIG. 17 is a diagram of the formation of a hinge module of a target driving object, according to an embodiment of the present disclosure.

FIG. 15 is a diagram of the structure of the driveshaft 13 and a hinge module 406 of a target driving object, according to an embodiment of the present disclosure. FIGS. 16 and 17 are diagrams of the structure of the hinge module 406 of a target driving object, according to an embodiment of the present disclosure.

Hereinafter, the structure of the driveshaft 13 will be described in detail with reference to FIGS. 15 through 17.

The driveshaft 13 may include a first shaft 402, a second shaft 404, and the hinge module 406.

The first shaft 402 is positioned at an end of the driveshaft 13 in a length direction and forms the rotation axis of the actuator 11. The second shaft 404 is positioned at an opposite end of the driveshaft 13 in the length direction and forms the rotation axis of the drive wheel 12. The hinge module 406 connects the first shaft 402 with the second shaft 404 and has a variable shape.

The hinge module 406 includes a first rotation unit 410, two second rotation units 430, and two rotation blocks 440.

The first rotation unit 410 is in the middle between the second rotation units 430. The second rotation units 430 are respectively positioned on the left and right sides of the first rotation unit 410 to symmetrically face each other. Each of the rotation blocks 440 is positioned between the first rotation unit 410 and one of the second rotation units 430 to connect the first rotation unit 410 with the second rotation unit 430.

In detail, the first rotation unit 410 may include upper and lower rotation beams 412, which extend in the length direction and vertically separated from each other by a predetermined distance, and an intermediate connection part 414, which is between the upper and lower rotation beams 412 to connect the upper and lower rotation beams 412 with each other. A first hinge hole 416 may be formed to penetrate each of opposite end portions of each of the upper and lower rotation beams 412 in a vertical direction, i.e., in a Z-axis direction.

The second rotation unit 430 has a shaft connecting hole 432, which is formed in an end portion of the second rotation unit 430 in an X-axis direction to penetrate the end portion in the length direction, i.e., the X-axis direction, so that the second rotation unit 430 is connected to the first shaft 402 or the second shaft 404. The first shaft 402 or the second shaft 404 is fixed and connected to the second rotation unit 430 through the shaft connecting hole 432. In addition, the second rotation unit 430 has left and right rotation beams 434 in an opposite end portion facing the first rotation unit 410 in the X-axis direction. The left and right rotation beams 434 protrude in the X-axis direction and are separated from each other in a Y-axis direction. A second hinge hole 436 is formed to penetrate each of the left and right rotation beams 434 in the Y-axis direction.

Each of the rotation blocks 440 is a block-shaped member that connects one of the second rotation units 430 with the first rotation unit 410. Each rotation block 440 includes a rotation body having a certain solid shape. The rotation body has a first rotary protrusion 442 and a second rotary protrusion 444. The first rotary protrusion 442 protrudes in the Z-axis direction to be inserted in the first hinge hole 416. The second rotary protrusion 444 protrudes in the Y-axis direction to be inserted into the second hinge hole 436. At this time, the first rotary protrusion 442 and the second rotary protrusion 444 may not be limited to protrusions that are fixedly formed on the rotation body but each may be constructed by forming a hole in the rotation body and inserting a certain beam-shaped shaft in the hole.

Accordingly, the rotation body is positioned between the upper and lower rotation beams 412 in the Z-axis direction and between the left and right rotation beams 434 in the Y-axis direction.

Referring to FIG. 15, the first rotary protrusion 442 is coupled to the first hinge hole 416 in the Z-axis direction, so that the first rotation unit 410 and each of the second rotation units 430 may rotate around a Z-axis on an XY plane, as shown by an arrow R1. The second rotary protrusion 444 is coupled to the second hinge hole 436 in the Y-axis direction, so that the first rotation unit 410 and each of the second rotation units 430 may rotate around a Y-axis on an XZ plane, as shown by an arrow R2.

Accordingly, the driveshaft 13 may have an initial mode and a deformation mode according to the variable shape of the hinge module 406.

In the initial mode, the hinge module 406 and the driveshaft 13 have a straight-line shape, so that the first shaft 402 and the second shaft 404 are coaxial and the respective rotation axes of the drive wheel 12 and the actuator 11 are also coaxial.

In the deformation mode, the hinge module 406 rotates and the driveshaft 13 is bent, so that the first shaft 402 and the second shaft 404 are biaxial and the respective rotation axes of the drive wheel 12 and the actuator 11 are also biaxial.

Due to the deformation of the hinge module 406 and the driveshaft 13, the position of the drive wheel 12 may vary with respect to the main body 1. For example, when a weight is put on the main body 1, the hinge module 406 is deformed, and the position of the main body 1 may be changed in the vertical direction or the back-and-forth direction with respect to the drive wheel 12.

Hereinafter, the repositioning module 14 will be described in detail with reference to the drawings.

Figure 18:
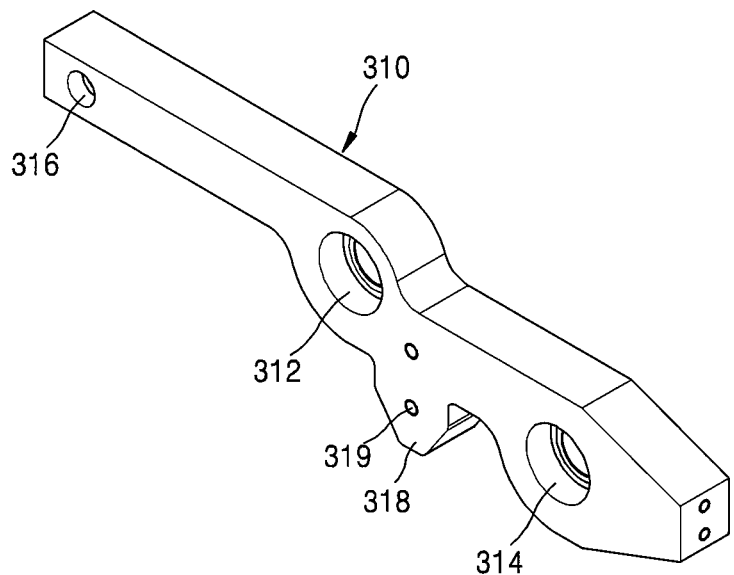
FIG. 18 is a diagram of the shape of a seesaw beam of a target driving object, according to an embodiment of the present disclosure.
Figure 19:
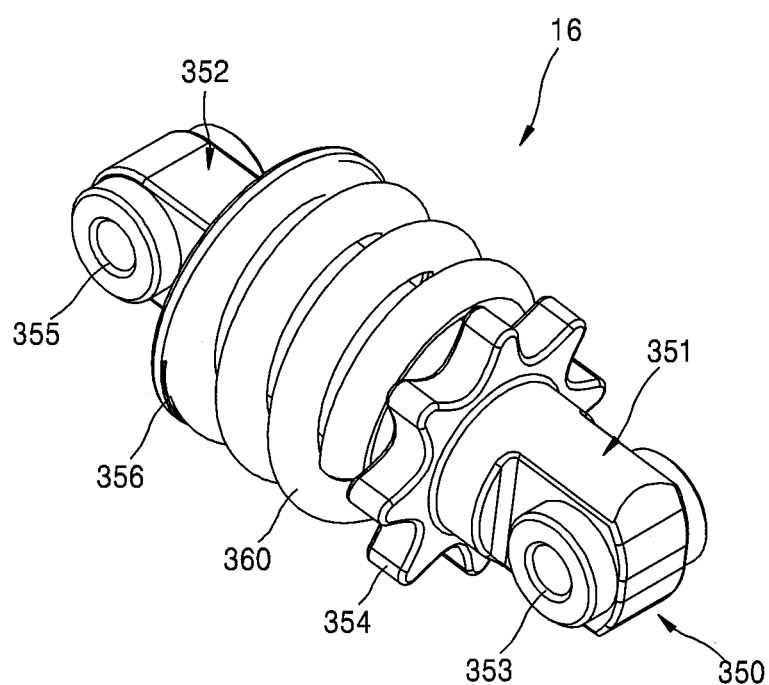
FIG. 19 is a diagram of the structure of a restoring force application unit of a target driving object, according to an embodiment of the present disclosure.
Figure 20:
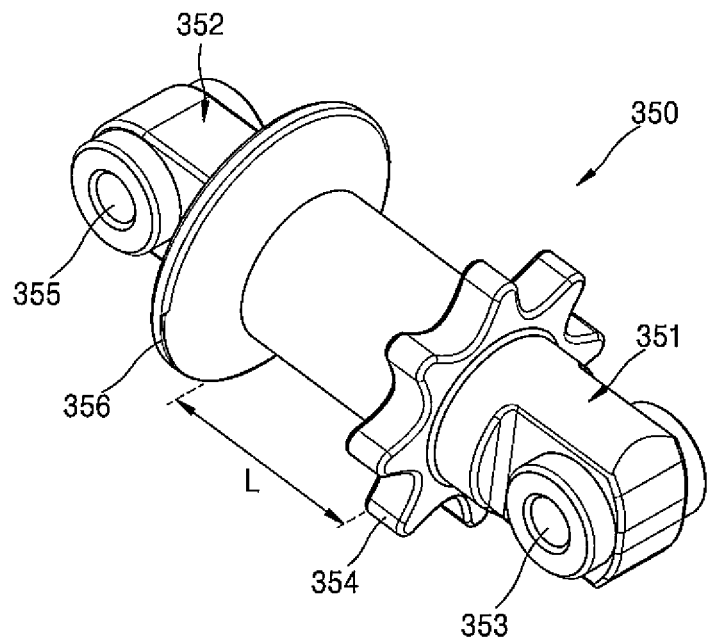
FIG. 20 is a diagram of the structure of a variable beam of a target driving object, according to an embodiment of the present disclosure.
Figure 21:
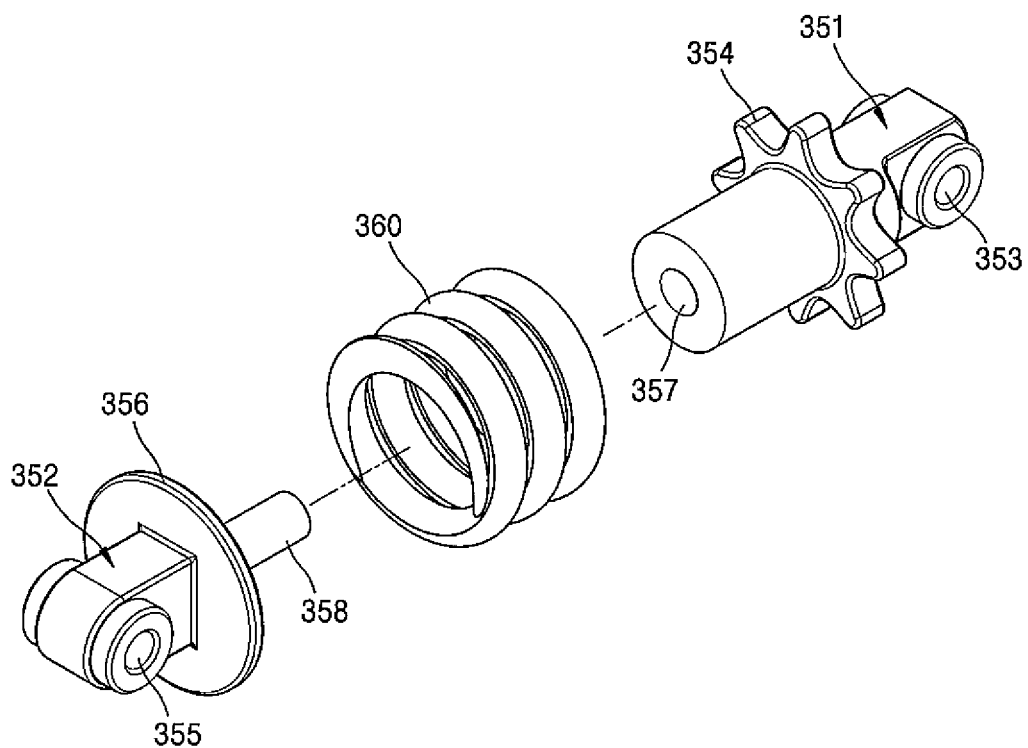
FIG. 21 is an exploded diagram of the structure of a restoring force application unit of a target driving object, according to an embodiment of the present disclosure.
Figure 22:
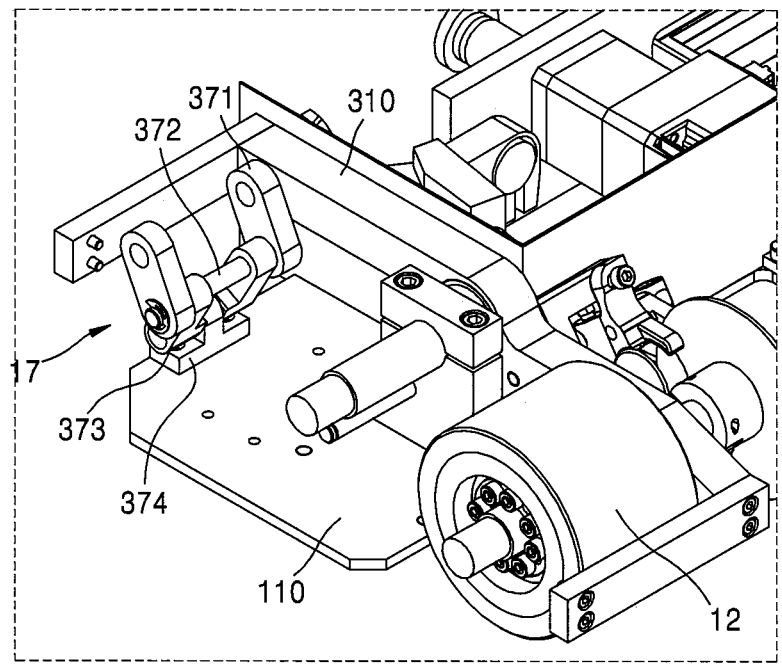
FIG. 22 is a diagram of the structure of a rotation connector of a target driving object, according to an embodiment of the present disclosure.

FIG. 18 is a diagram of the shape of a seesaw beam of a target driving object, according to an embodiment of the present disclosure. FIG. 19 is a diagram of the structure of a restoring force application unit of a target driving object, according to an embodiment of the present disclosure. FIG. 20 is a diagram of the structure of a variable beam of a target driving object, according to an embodiment of the present disclosure. FIG. 21 is an exploded diagram of the structure of a restoring force application unit of a target driving object, according to an embodiment of the present disclosure. FIG. 22 is a diagram of the structure of a rotation connector of a target driving object, according to an embodiment of the present disclosure. Meanwhile, besides FIGS. 17 through 22, other drawings will be referred to.

When the function of the repositioning module 14 is described in relation to the configuration of the driveshaft 13 described above, the repositioning module 14 is a member that applies a restoring force to the driveshaft 13 to enable the driveshaft 13 to remain in the initial mode.

In detail, the repositioning module 14 applies a restoring force to the driveshaft 13 so that the driveshaft 13 remains in the initial mode. However, when a force pushing downwards is applied to the main body 1 and overcomes the restoring force of the repositioning module 14 in a state where the drive wheel 12 is on the ground, the driveshaft 13 enters the deformation mode. When the restoring force of the repositioning module 14 overcomes the downward pushing force on the main body 1 or the downward pushing force is eliminated, the driveshaft 13 returns to the initial mode due to the restoring force of the repositioning module 14.

The repositioning module 14 includes the seesaw unit 15 which has an end portion connected to the second shaft 404 and enables a seesaw motion around a certain axis, the restoring force application unit 16 which applies a restoring force to an opposite end portion of the seesaw unit 15, and the rotation connector 17 which connects the seesaw unit 15 with the restoring force application unit 16.

The seesaw unit 15 will be described first.

The seesaw unit 15 includes a seesaw beam 310 and a seesaw jig 330.

Referring to FIG. 18, the seesaw beam 310 has a certain beam shape, which has a certain length in a back-and-forth direction and has a first end portion in the front and a second end portion in the back. The first end portion of the seesaw beam 310 is positioned beside the drive wheel 12 in a direction of the rotation axis of the drive wheel 12. The second end portion extends towards the back. Desirably, two seesaw beams 310 may be provided to be symmetrically and respectively arranged at opposite sides of the drive wheel 12 in the direction of the rotation axis of the drive wheel 12. In addition, a front connecting beam 320 and a back connecting beam 321 may be provided to connect the seesaw beams 310 at the opposite sides with each other.

Each seesaw beam 310 includes a central hole 312 penetrating a lengthwise central portion of the seesaw beam 310 in a horizontal direction, a first side hole 314 penetrating the first end portion in the horizontal direction, a second side hole 316 penetrating the second end portion in the horizontal direction, and a braking protrusion 318 protruding downwards from a bottom of a lengthwise portion between the central hole 312 and the first side hole 314. Meanwhile, the seesaw beam 310 may also include an installation hole 319 penetrating a portion of the seesaw beam 310 in the horizontal direction.

At this time, the first side hole 314 is in a path in which the second shaft 404 extends. Accordingly, the second shaft 404 passes through the first side hole 314 in the horizontal direction and is connected to the drive wheel 12. Desirably, the internal diameter of the first side hole 314 may be equal to or greater than the diameter of the second shaft 404.

The second side hole 316 may be coupled to the rotation connector 17, which will be described below, and may receive a restoring force from the restoring force application unit 16 via the rotation connector 17.

As shown in FIG. 13, when the first end portion of the seesaw beam 310 is inclined downwards at a certain angle, the braking protrusion 318 contacts the bottom plate 110, thereby preventing the first end portion of the seesaw beam 310 from being further inclined downwards and maintaining the position of the seesaw beam 310.

At this time, when the braking protrusion 318 is in contact with the bottom plate 110, the hinge module 406 and the driveshaft 13 have a straight-line shape. In other words, as shown in FIG. 13, the driveshaft 13 maintains the initial mode when the braking protrusion 318 is in contact with the bottom plate 110.

The seesaw jig 330 includes a certain protruding structure, which is in the back of the drive wheel 12 and fixed to the bottom plate 110 so as to have a fixed position. At this time, when two seesaw beams 310 are provided, as described above, the seesaw jig 330 may be positioned in a space between the two seesaw beams 310.

A seesaw axle 332 and a holding shaft 334 may be provided in the seesaw jig 330.

The seesaw axle 332 protrudes in a lateral direction and is inserted into the central hole 312, so that the seesaw beam 310 performs a seesaw motion around the seesaw axle 332.

The holding shaft 334 is coupled to the restoring force application unit 16, which will be described below, to enable the restoring force application unit 16 to rotate. The holding shaft 334 may be provided below the seesaw axle 332. Meanwhile, the holding shaft 334 may not be necessarily provided in the seesaw jig 330 but may be provided in a separate member.

Meanwhile, as shown in FIG. 14, the seesaw jig 330 may have a seesaw hole 335 and a holding hole 336, which penetrate the seesaw jig 330 in the horizontal direction, so that the seesaw axle 332 and the holding shaft 334 are inserted into the seesaw hole 335 and the holding hole 336, respectively.

The restoring force application unit 16 will be described with reference to FIGS. 19 through 21 below.

The restoring force application unit 16 includes a variable beam 350 of which the length varies and an elastic portion 360 which applies an elastic force to the variable beam 350 to elongate the variable beam 350. The variable beam 350 is configured to be elongated by receiving the elastic force from the elastic portion 360 and push upwards the second end portion of the seesaw beam 310. Accordingly, the seesaw beam 310 rotates around the seesaw axle 332, thereby inclining the first end portion downward. At this time, the variable beam 350 is connected to the seesaw beam 310 via the rotation connector 17, and the restoring force is applied to the seesaw beam 310 via the rotation connector 17.

The configuration of the variable beam 350 will be described first.

In an embodiment, the variable beam 350 includes a front beam 351 and a rear beam 352 respectively positioned in the front and the back in a length direction.

The front beam 351 includes a front hole 353 and a first supporting extension 354.

The front hole 353 is formed to penetrate a front portion of the front beam 351 in the horizontal direction. As shown in FIG. 14, the holding shaft 334 provided in the seesaw jig 330 passes through and coupled to the front hole 353, so that the variable beam 350 is rotatable around the holding shaft 334.

The first supporting extension 354 is a member that has an outer diameter extending by a certain width outward from a middle portion of the front beam 351.

The rear beam 352 includes a rear hole 355 and a second supporting extension 356.

The rear hole 355 is formed to penetrate a rear portion of the rear beam 352 in the horizontal direction. The rear hole 355 is rotatably coupled to the rotation connector 17, which will be described below.

The second supporting extension 356 is a member that has an outer diameter extending by a certain width outward from a middle portion of the rear beam 352.

The front beam 351 and the rear beam 352 are mutually displaced in a length direction, and therefore, a distance L between the first supporting extension 354 and the second supporting extension 356 varies. As a result, the whole length of the variable beam 350 varies.

In an embodiment, as shown in FIG. 21, an insertion hole 357 is formed to penetrate a rear portion of the front beam 351 in the length direction, and an insertion beam 358 is provided in a front portion of the rear beam 352 to be inserted into the insertion hole 357. Therefore, a distance between the first supporting extension 354 and the second supporting extension 356 varies with a length of the insertion beam 358, by which the insertion beam 358 is inserted into the insertion hole 357. As a result, the whole length of the variable beam 350 may vary. Alternatively, the insertion hole 357 may be formed in the rear beam 352, and other modes may be considered.

The elastic portion 360 includes a coil spring. The elastic portion 360 may be configured to be wound around the front portion of the rear beam 352 and the rear portion of the front beam 351 and to apply an elastic force between the first supporting extension 354 and the second supporting extension 356. Accordingly, when the first supporting extension 354 and the second supporting extension 356 approach each other and the length of the variable beam 350 is reduced, the first supporting extension 354 and the second supporting extension 356 receive the elastic force from the elastic portion 360.

The rotation connector 17 will be described with reference to FIG. 22 below.

The rotation connector 17 is a member that connects the seesaw beam 310 with the variable beam 350 and transmits the restoring force of the restoring force application unit 16 to the seesaw unit 15.

The rotation connector 17 may include a connection jig 374, a lower beam 373, an upper beam 371, and a connection shaft 372.

The connection jig 374 is positioned in the back of the seesaw jig 330 and fixed to the bottom plate 110.

An end of the lower beam 373 is rotatably connected to the connection jig 374. Desirably, as shown in FIG. 22, an upper end of the connection jig 374 protrudes, the lower beam 373 is arranged on the left and right sides of the upper end of the connection jig 374, and a lower end of the lower beam 373 is rotatably connected to the connection jig 374.

An end of the upper beam 371 is rotatably connected to the second end portion of the seesaw beam 310. At this time, the upper beam 371 may be rotatably connected to the seesaw beam 310 via the second side hole 316 provided in the second end portion of the seesaw beam 310. For example, a certain rotation protrusion functioning as an axis may be provided in the end of the upper beam 371, or a certain shaft may be connected to the end of the upper beam 371.

The connection shaft 372 connects another end of the upper beam 371 with another end of the lower beam 373. In addition, the rear hole 355 of the rear beam 352 is also connected to the ends of the upper beam 371 and lower beam 373 by the connection shaft 372. For example, as shown in FIG. 22, the lower beam 373 may be connected to opposite ends of the rear beam 352 and the upper beam 371 may be connected to an outside of the lower beam 373.

Figure 23:
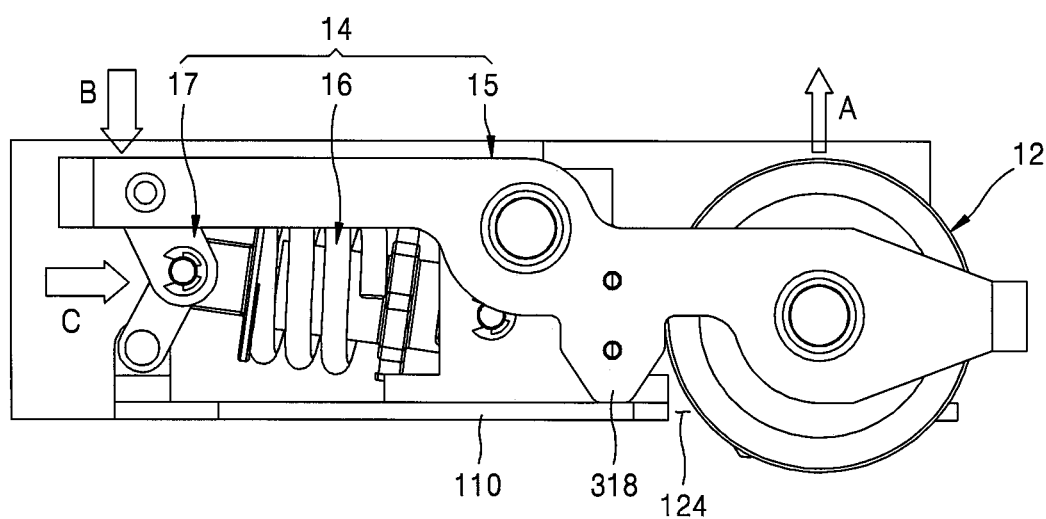
FIGS. 23 through 25 are diagrams showing the operation of a drive module of a target driving object, according to an embodiment of the present disclosure.
Figure 24:
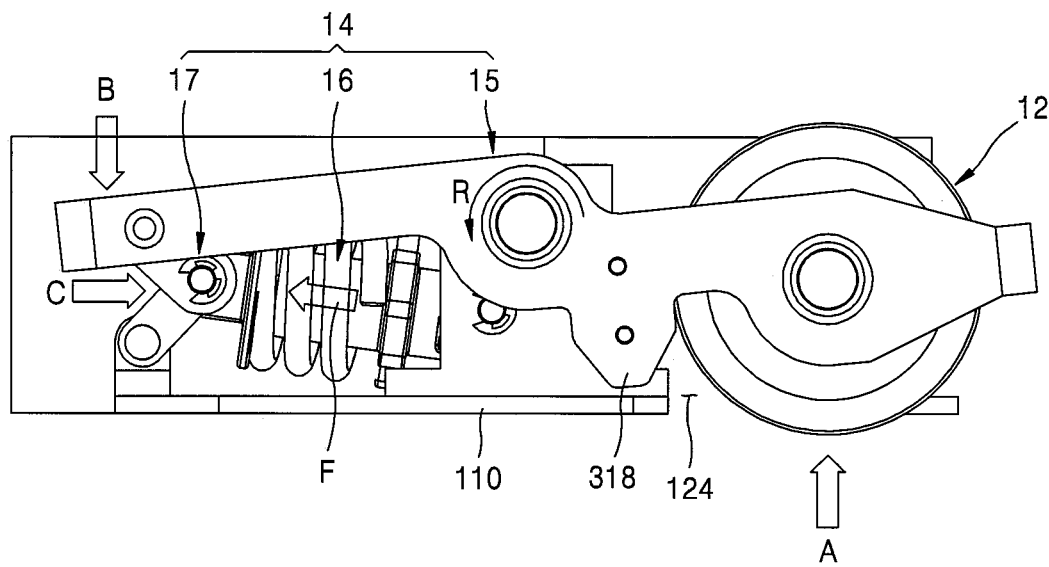

The operation of the configuration of the seesaw unit 15, the restoring force application unit 16, and the rotation connector 17 will be described with reference to FIGS. 23 and 24. When a force is applied upwards to the drive wheel 12, the seesaw beam 310 rotates around the seesaw axle 332 as shown by an arrow R, so that the first end portion rises as shown by an arrow A and the second end portion falls as shown by an arrow B. Accordingly, an angle between the upper beam 371 and the lower beam 373 of the rotation connector 17 decreases, and the connection shaft 372 moves forward as shown by an arrow C. As a result, the rear beam 352 is pushed forward, and therefore, the elastic portion 360 is compressed and applies an elastic force resisting the compression. The elastic force pushes connection shaft 372 backwards and consequently moves the drive wheel 12 downwards to the original position, thereby acting as a restoring force that restores the driveshaft 13 to the initial mode. At this time, the variable beam 350 may rotate around the holding shaft 334 by a certain angle.

Figure 25:
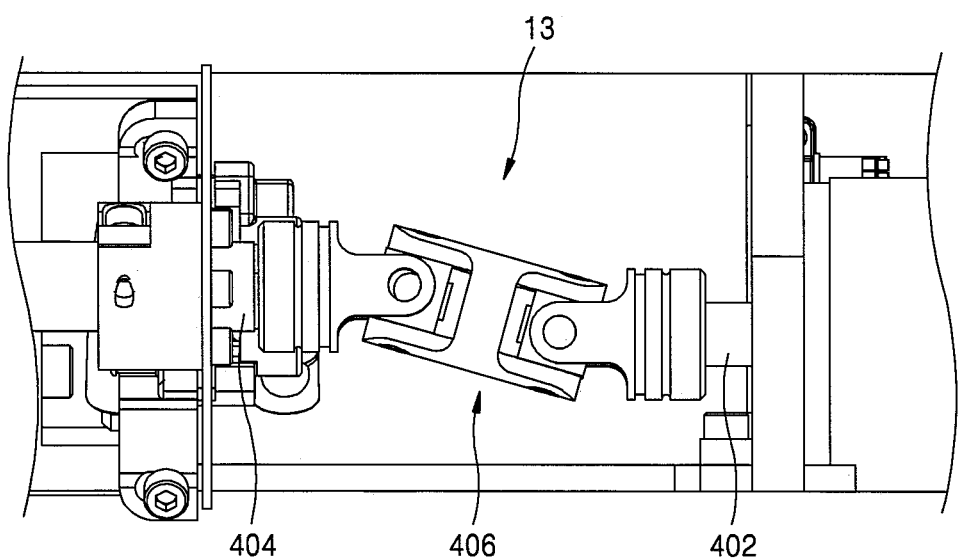

At this time, the driveshaft 13 is deformed from a straight-line shape and enters the deformation mode, as shown in FIG. 25. Accordingly, the first shaft 402 and the second shaft 404 become biaxial.

The braking module 18 will be described below.

As shown in FIGS. 14 and 15, the braking module 18 may include a braking plate 510, which is rotatably fixed to the second shaft 404, and a friction portion 520, which gives friction to the braking plate 510. At this time, the friction portion 520 may be fixed to a side portion of the seesaw beam 310 and installed in the seesaw beam 310 through the installation hole 319 formed in the seesaw beam 310.

When a certain signal is generated by a user, the friction portion 520 approaches the braking plate 510 and gives friction, so that the rotation of the second shaft 404 and the drive wheel 12 may be slowed down or stopped.

Figure 26:
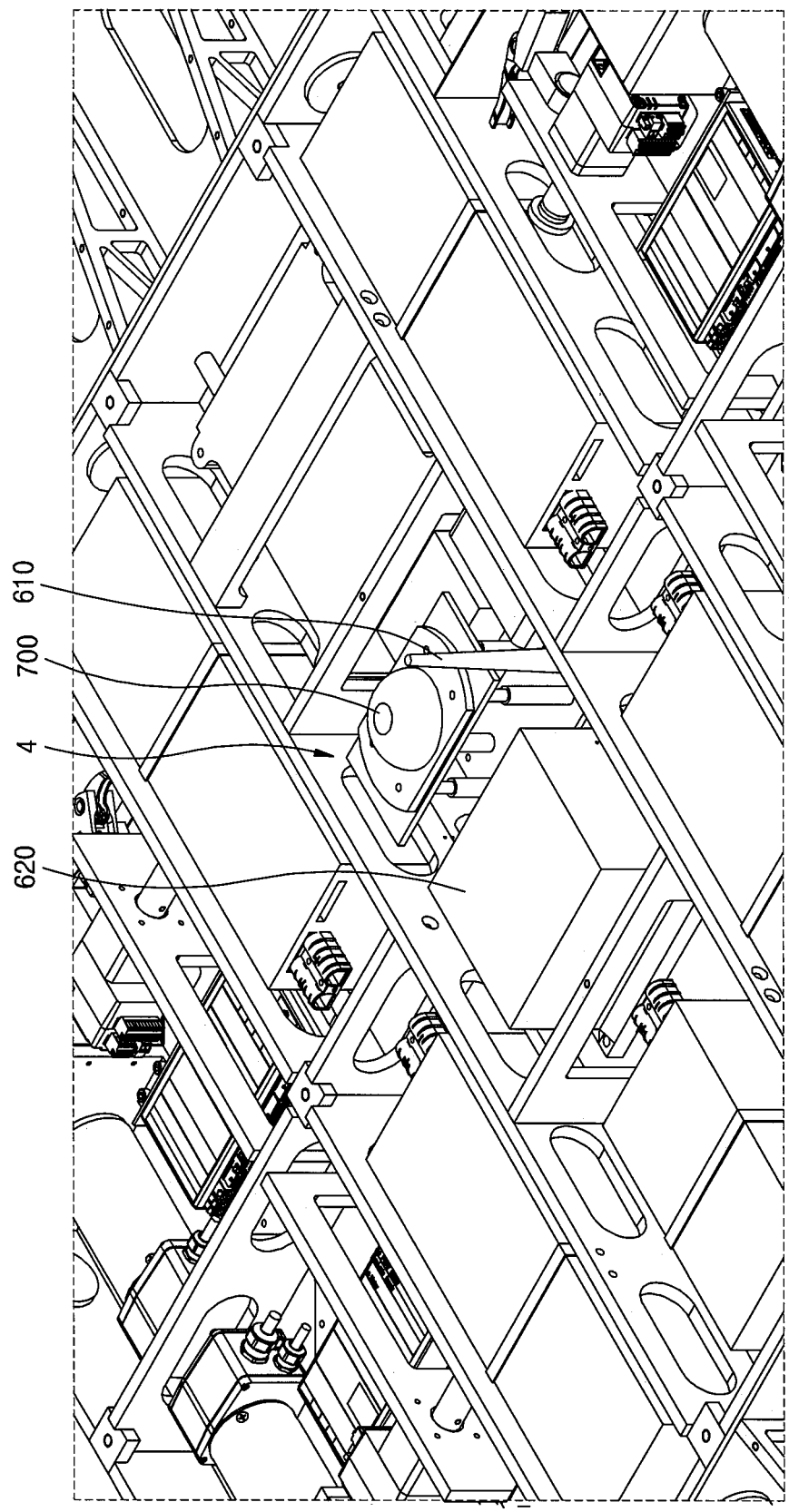
FIG. 26 is a diagram of the structure of a communication module of a target driving object, according to an embodiment of the present disclosure.

FIG. 26 is a diagram of the structure of the communication module 4.

The communication module 4 is loaded in a loading space provided in the base frame 102. The communication module 4 is provided to exchange signals with an external communication device.

In detail, the communication module 4 may include an antenna 610, which protrudes upwards from the main body 1, and a signal processor 620. The signal processor 620 may be connected to the drive module 3, may process signals received from outside the main body 1, and may control the operation of the drive module 3.

The antenna 610 protrudes above the main body 1, but the antenna 610 may be folded or compressed and thus inserted into the main body 1 when a weight is put thereon. Accordingly, the antenna 610 is prevented from being damaged.

Meanwhile, a sensor device 700 may also be provided to sense a certain weight put on the main body 1.

Figure 27:
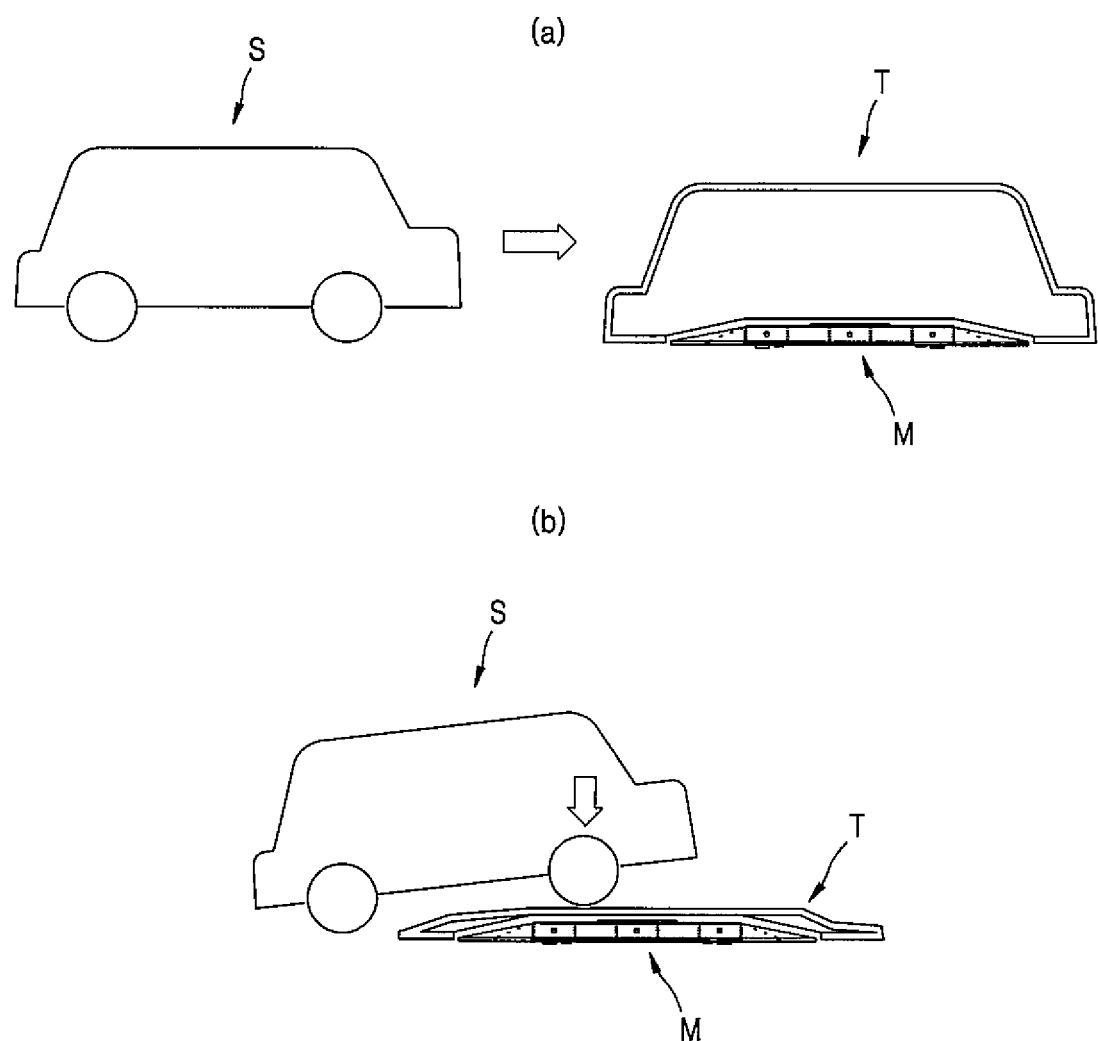
FIG. 27 is a diagram of a crash test using a target driving object, according to an embodiment of the present disclosure.

FIG. 27 is a diagram of a crash test using a target driving object, according to an embodiment of the present disclosure. (a) represents the before crash, and b represents after crash. Here, reference characters S, T, and M respectively denote a real vehicle, a target vehicle structure, and a target driving object according to an embodiment of the present disclosure. A certain structure is put on a target driving object to construct a target vehicle, and a crash test is carried out when a real vehicle approaches the target vehicle.

According to an embodiment of the present disclosure, the main body 1 and the sub-body 6 may be selectively combined with each other into a target driving object, so that a crash test may be performed according to a user's intention. In particular, the power and size of the target driving object may be increased by the drive module 3 of the sub-body 6, so that a similar situation to a real crash may be reproduced.

In addition, since the sloped skirt 2 is provided at the outside of the target driving object, a certain colliding object may climb up on or down from the target driving object without giving a shock to the target driving object when the colliding object crashes into the target driving object. Accordingly, damage or breakdown of the target driving object may be prevented. In other words, even when a target vehicle structure is wrecked by a crash, the target driving object actually performing a drive is not damaged.

In addition, since the drive wheel 12 is configured to be displaceable with respect to the main body 1 and the sub-body 6 and to receive a restoring force from a restoration module, occurrence of damage to members of the drive module 3 may be avoided even when the colliding object climbs up and puts a weight on the target driving object.

In addition, an antenna of the communication module 4 is folded or compressed when the colliding object climbs up on the target driving object and thus avoids damage by the colliding object, so that a failure rate may be decreased.

While preferred embodiments have been shown and described, the present disclosure is not limited thereto. It is apparent that various modifications can be made in the embodiments by those skilled in the art without departing from the spirit of the present disclosure as defined by the appended claims. The modifications will not be considered separately from the spirits or perspectives of the present disclosure.

The invention claimed is:

1. A target driving object for carrying out a crash test with a colliding object for a crash prevention system test, the target driving object comprising:
   a main body loaded with a drive module and a communication module exchanging signals with an external communication device; and
   a sloped skirt positioned to surround an outer circumferential side of the main body,
   wherein the sloped skirt has a sloped surface inclining downwards and outwards from a border between the sloped skirt and the main body, the sloped surface is formed in an outer circumference of the target driving object, and the colliding object is allowed to climb up on or down from the main body along the sloped surface,
   wherein the drive module comprises:
   an actuator producing torque;
   a drive wheel exposed downwards through the wheel hole to be on the ground, receiving the torque from the actuator, and moving the target driving object;
   a driveshaft extending to a length and transmitting the torque of the actuator to the drive wheel; and
   a repositioning module,
   wherein the drive wheel is configured to be vertically displaceable with respect to the main body, and
   the repositioning module applies a restoring force to the driveshaft to maintain a rotation axis of the drive wheel and a rotation axis of the actuator to be coaxial,
   wherein the driveshaft comprises:
   a first shaft positioned at an end of the driveshaft in a length direction to form the rotation axis of the actuator;
   a second shaft positioned at an opposite end of the driveshaft in the length direction to form the rotation axis of the drive wheel; and
   a hinge module connecting the first shaft with the second shaft and having a variable shape,
   wherein the driveshaft has an initial mode and a deformation mode according to the variable shape of the hinge module, the driveshaft having two modes: an initial mode where the drive shaft is in a straight-line shape, the first shaft and the second shaft are coaxial, and the respective rotation axes of the drive wheel and the actuator are coaxial, and a deformation mode where the driveshaft is bent, the first shaft and the second shaft are biaxial, and the respective rotation axes of the drive wheel and the actuator are biaxial; and
   wherein the modes change by the repositioning module applying the restoring force to the driveshaft to allow the driveshaft to remain in the initial mode;
   when a force pushing downwards is applied to the main body and overcomes the restoring force of the repositioning module in a state where the drive wheel is on the ground, the driveshaft enters the deformation mode, and
   when the restoring force of the repositioning module overcomes the downward pushing force on the main body or the downward pushing force is eliminated, the driveshaft returns to the initial mode due to the restoring force of the repositioning module.

2. The target driving object of claim 1, wherein
   the main body comprises a base frame having a framework and a loading space in which the drive module and the communication module are loaded,
   wherein the base frame comprises:
   a bottom plate forming a bottom surface and having a wheel hole penetrating the bottom plate downwards;
   a top plate forming a top surface; and
   a side plate forming an outer circumference,
   wherein the sloped skirt comprises:
   a bottom skirt plate forming bottom surface;
   a side skirt plate located at a side of the bottom skirt plate and standing upwards to form a side surface;
   a triangular frame having a triangular shape with a base side, a lateral side, and an oblique side, the base side being on the bottom skirt plate, and the lateral side being in contact with the side skirt plate; and
   a sloped plate put on the oblique side of the triangular frame to forms the sloped surface, and
   wherein the side plate and the side skirt plate are detachably combined with each other using the connecting means.

3. The target driving object of claim 2, wherein the hinge module comprises:
   a first rotation unit which is bilaterally symmetrical;
   two second rotation units respectively positioned on left and right sides of the first rotation unit to face each other with the first rotation unit between the second rotation units; and
   two rotation blocks each positioned between the first rotation unit and one of the second rotation units to connect the first rotation unit with the second rotation unit,
   the first rotation unit and the rotation blocks are rotatable around a Z-axis, the second rotation units and the rotation blocks are rotatable around a Y-axis perpendicular to the Z-axis, and
   the second rotation units, the first shaft, and the second shaft are combined with one another in an X-axis direction perpendicular to the Z-axis and the Y-axis.

4. The target driving object of claim 3, wherein:
   the first rotation unit has a first hinge hole penetrating each of opposite sides of the first rotation unit in a Z-axis direction,
   each of the second rotation units has a shaft connecting hole and a second hinge hole, the shaft connecting hole penetrating a side of each of the second rotation units in the X-axis direction, each of the second rotation units being connected to the first shaft or the second shaft, and
   a second hinge hole penetrating an opposite side of each of the second rotation units in a Y-axis direction, the opposite side facing the first rotation unit, and
   each of the rotation blocks has a first rotary protrusion and a second rotary protrusion, the first rotary protrusion protruding in the Z-axis direction to be inserted in the first hinge hole, and a second rotary protrusion protruding in the Y-axis direction to be inserted into the second hinge hole.

5. The target driving object of claim 1, wherein the repositioning module comprises: a seesaw unit having an end portion connected to the second shaft and enabling a seesaw motion around an axis; a restoring force application unit applying a restoring force to an opposite end portion of the seesaw unit; and a rotation connector connecting the seesaw unit with the restoring force application unit.

6. The target driving object of claim 5, wherein the seesaw unit comprises:
seesaw beam and a seesaw jig,
the seesaw beam has a length in a back-and-forth direction and has a first end portion and a second end portion,
the seesaw beam comprises: a central hole penetrating a lengthwise central portion of the seesaw beam in a horizontal direction;
a first side hole penetrating the first end portion in the horizontal direction; and
a second side hole penetrating the second end portion in the horizontal direction,
the first end portion is positioned beside the drive wheel in a direction of the rotation axis of the drive wheel, the first side hole is in a path in which the second shaft extends, the second shaft passes through the first side hole in the horizontal direction and is connected to the drive wheel,
the second side hole is rotatably coupled to the rotation connector such that the second end portion receives the restoring force from the restoring force application unit via the rotation connector,
the seesaw jig is positioned in the back of the drive wheel and fixed to the bottom plate so as to have a fixed position and comprises a seesaw axle extending in a horizontal direction, and
the seesaw axle is inserted into the central hole such that the seesaw beam performs a seesaw motion around the seesaw axle.

7. The target driving object of claim 6, wherein the restoring force application unit comprises:
a variable beam of which a length varies; and
an elastic portion applying an elastic force to the variable beam to elongate the variable beam, and
the variable beam is elongated by receiving the elastic force from the elastic portion and pushes upwards the second end portion of the seesaw beam through the rotation connector such that the seesaw beam rotates around the seesaw axle and the first end portion inclines downward.

8. The target driving object of claim 7, wherein the variable beam comprises:
a front beam and a rear beam respectively positioned in the front and the back in a length direction,
the front beam has a first supporting extension having an outer diameter extending from a middle portion of the front beam,
the rear beam has a second supporting extension having an outer diameter extending from a middle portion of the rear beam,
the front beam and the rear beam are mutually displaced in the length direction such that a distance between the first supporting extension and the second supporting extension and a whole length of the variable beam vary, and
the elastic portion is positioned between the first supporting extension and the second supporting extension to apply the elastic force to the first supporting extension and the second supporting extension.

9. The target driving object of claim 8, wherein:
an insertion hole is formed to penetrate a front portion of the rear beam or a rear portion of the front beam in the length direction and an insertion beam is provided in the rear portion of the front beam or the front portion of the rear beam to be inserted into the insertion hole such that the whole length of the variable beam varies with a length of the insertion beam, by which the insertion beam is inserted into the insertion hole, and
the elastic portion comprises a coil spring and is configured to be wound around the front portion of the rear beam and the rear portion of the front beam.

10. The target driving object of claim 8, wherein:
the seesaw jig further comprises a holding shaft, and
the front beam has a front hole formed to penetrate a front portion of the front beam in the horizontal direction and the holding shaft passes through and coupled to the front hole such that the variable beam is rotatable around the holding shaft.

11. The target driving object of claim 9, wherein:
the rear beam has a rear hole formed to penetrate a rear portion of the rear beam in the horizontal direction, and
the rotation connector comprises:
a connection jig positioned in the back of the seesaw jig and fixed to the bottom plate;
a lower beam having an end rotatably connected to the connection jig and another end rotatably connected to the rear hole of the rear beam;
an upper beam having an end rotatably connected to the second end portion of the seesaw beam and another end rotatably connected to the rear hole of the rear beam; and
a connection shaft connecting the another end of the lower beam, the another end of the lower beam, and the rear hole of the rear beam with one another.

12. The target driving object of claim 1, wherein the drive module further comprises a braking module, and the braking module comprises:
a braking plate rotatably fixed to the driveshaft; and
a friction portion contacting the braking plate and producing friction.

13. The target driving object of claim 1, wherein the communication module comprises an antenna protruding upwards from the main body, and the antenna is configured to be folded or compressed and thus inserted into the main body when a weight is put on the antenna.

* * * * *